US012712171B2

(12) United States Patent
Jarrold et al.

(10) Patent No.: US 12,712,171 B2

(45) Date of Patent: Aug. 18, 2026

(54) RADIALLY SEGMENTED ION GUIDE AND EXAMPLE APPLICATIONS THEREOF

(71) Applicant: THE TRUSTEES OF INDIANA UNIVERSITY, Bloomington, IN (US)

(72) Inventors: Martin F. Jarrold, Bloomington, IN (US); David W. Reitenbach, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 347 days.

(21) Appl. No.: 18/463,105

(22) Filed: Sep. 7, 2023

(65) Prior Publication Data

US 2024/0087875 A1 Mar. 14, 2024

Related U.S. Application Data

(60) Provisional application No. 63/405,007, filed on Sep. 9, 2022.

(51) Int. Cl.

*H01J 49/42* (2006.01)
*H01J 49/00* (2006.01)
*H01J 49/06* (2006.01)

(52) U.S. Cl.

CPC ...... *H01J 49/4225* (2013.01); *H01J 49/0031* (2013.01); *H01J 49/062* (2013.01)

(58) Field of Classification Search

CPC ...... H01J 49/027; H01J 49/062; H01J 49/067; H01J 49/4225; H01J 49/4245

See application file for complete search history.

(56) References Cited

U.S. PATENT DOCUMENTS 3,019,168 A 1/1962 Taylor
3,294,085 A 12/1966 Wallace (Continued)

FOREIGN PATENT DOCUMENTS

CA 2484769 A1 4/2005
CN 103493173 1/2014

(Continued)

OTHER PUBLICATIONS

El-Baba, Tarick J., et al., "Melting Proteins Confined in Nanodroplets With 10.6 urn Light Provided Clues About Early Steps of Denaturation", Chemical Communications, vol. 54, No. 26, 3270-3273, 2018.

(Continued)

*Primary Examiner* — David E Smith

(74) *Attorney, Agent, or Firm* — Barnes & Thornburg LLP

(57) ABSTRACT

A charged particle guide includes a plurality of electrically conductive segments radially spaced apart from one another about an opening defined axially through the segments, wherein the opening defines a central axis passing centrally and axially therethrough such that charged particles are received at one end of the opening and pass through an opposite end of the opening, at least one voltage source configured to produce and supply separate voltages to each of the segments, and at least one control circuit configured to control supply of selected voltages to the segments to create an electric field within the opening configured to cause charged particles entering the one end of the opening along a first axial path relative to the central axis to exit the (Continued)

opposite end of the opening along a second axial path relative to the central axis, wherein the first and second axial paths are not collinear.

15 Claims, 11 Drawing Sheets

(56) References Cited

U.S. PATENT DOCUMENTS

| | | | |
|---|---|---|---|
| 5,285,063 | A | 2/1994 | Schwartz |
| 5,478,745 | A | 12/1995 | Samulski |
| 5,572,025 | A | 11/1996 | Cotter |
| 5,770,857 | A | 6/1998 | Fuerstenau |
| 5,847,386 | A | 12/1998 | Thomson |
| 5,863,541 | A | 1/1999 | Samulski |
| 5,869,248 | A | 2/1999 | Yuan |
| 5,877,022 | A | 3/1999 | Stinchcomb |
| 5,880,466 | A | 3/1999 | Benner |
| 5,882,652 | A | 3/1999 | Valdes |
| 5,886,346 | A | 3/1999 | Makarov |
| 5,905,040 | A | 5/1999 | Mazzara |
| 5,916,563 | A | 6/1999 | Young |
| 5,965,358 | A | 10/1999 | Carrion |
| 6,013,487 | A | 1/2000 | Mitchell |
| 6,083,702 | A | 7/2000 | Mitchell |
| 6,156,303 | A | 12/2000 | Russell |
| 6,183,950 | B1 | 2/2001 | Madonna |
| 6,583,408 | B2 | 6/2003 | Smith |
| 6,630,662 | B1 | 10/2003 | Loboda |
| 6,744,042 | B2 | 6/2004 | Zajfman |
| 6,753,523 | B1 | 6/2004 | Whitehouse |
| 6,888,130 | B1 | 5/2005 | Gonin |
| 7,314,912 | B1 | 1/2008 | Hallek |
| 7,829,842 | B2 | 11/2010 | Makarov |
| 8,294,085 | B2 | 10/2012 | Ding |
| 8,395,112 | B1 | 3/2013 | Bier |
| 8,409,870 | B2 | 4/2013 | Van Wuijckhuijse |
| 8,766,170 | B2 | 7/2014 | Guna |
| 8,866,074 | B2 | 10/2014 | Okumura |
| 8,963,075 | B2 | 2/2015 | Chen et al. |
| 9,095,793 | B2 | 8/2015 | Flagan |
| 9,294,085 | B1 | 3/2016 | Gruner |
| 9,395,112 | B2 | 7/2016 | Prins |
| 9,409,870 | B2 | 8/2016 | Armani |
| 9,472,390 | B2 | 10/2016 | Verenchikov |
| 10,056,244 | B1 | 8/2018 | Quarmby |
| 10,088,451 | B2 | 10/2018 | Giles et al. |
| 11,177,122 | B2 | 11/2021 | Jarrold |
| 11,227,759 | B2 | 1/2022 | Jarrold |
| 11,232,941 | B2 | 1/2022 | Jarrold |
| 11,257,665 | B2 | 2/2022 | Jarrold |
| 11,942,317 | B2 | 3/2024 | Clemmer |
| 12,112,936 | B2 | 10/2024 | Jarrold |
| 2001/0013760 | A1 | 8/2001 | Uchida et al. |
| 2003/0155502 | A1 | 8/2003 | Grosshans |
| 2004/0169137 | A1 | 9/2004 | Westphall |
| 2004/0211897 | A1 * | 10/2004 | Kim ..................... H01J 49/066 250/288 |
| 2005/0236375 | A1 | 10/2005 | Gefter |
| 2007/0102634 | A1 | 5/2007 | Frey |
| 2007/0254352 | A1 | 11/2007 | Schaffer |
| 2009/0020694 | A1 | 1/2009 | Flory |
| 2009/0057553 | A1 | 3/2009 | Goodenowe |
| 2009/0078866 | A1 | 3/2009 | Li |
| 2009/0108194 | A1 | 4/2009 | Page |
| 2009/0189069 | A1 | 7/2009 | Chen |
| 2009/0294641 | A1 | 12/2009 | Konicek |
| 2009/0294655 | A1 | 12/2009 | Ding |
| 2010/0084549 | A1 | 4/2010 | Ermakov |
| 2010/0084552 | A1 | 4/2010 | Kawana |
| 2010/0090102 | A1 | 4/2010 | Rather |
| 2010/0227310 | A1 | 9/2010 | Manalis |
| 2010/0234837 | A1 | 9/2010 | Alfano |
| 2010/0314538 | A1 | 12/2010 | Makarov |
| 2010/0320377 | A1 | 12/2010 | Cotter |
| 2011/0095175 | A1 | 4/2011 | Bateman |
| 2012/0112056 | A1 | 5/2012 | Brucker |
| 2012/0138785 | A1 | 6/2012 | Makarov et al. |
| 2012/0282641 | A1 | 11/2012 | Reilly |
| 2012/0313004 | A1 * | 12/2012 | Shaw .................... H01J 49/062 250/396 R |
| 2013/0068942 | A1 | 3/2013 | Verenchikov |
| 2013/0124099 | A1 | 5/2013 | Ecker |
| 2013/0175440 | A1 | 7/2013 | Perelman |
| 2013/0175441 | A1 * | 7/2013 | Zanon .................. H01J 49/065 250/288 |
| 2013/0200261 | A1 | 8/2013 | Mizutani |
| 2013/0234017 | A1 | 9/2013 | Kaltashov |
| 2014/0131568 | A1 | 5/2014 | Green |
| 2014/0197333 | A1 | 7/2014 | Jolliffe |
| 2014/0299766 | A1 | 10/2014 | Anderson et al. |
| 2014/0346344 | A1 | 11/2014 | Chen |
| 2015/0008316 | A1 | 1/2015 | Guna |
| 2015/0021472 | A1 | 1/2015 | Makarov |
| 2015/0228445 | A1 * | 8/2015 | Chang ................. H01J 37/3171 250/396 R |
| 2015/0325425 | A1 | 11/2015 | Makarov |
| 2015/0331000 | A1 | 11/2015 | Collier |
| 2016/0005580 | A1 | 1/2016 | Grinfeld |
| 2016/0035556 | A1 | 2/2016 | Berkout |
| 2016/0181084 | A1 | 6/2016 | Smith |
| 2016/0336165 | A1 | 11/2016 | Guna |
| 2017/0040152 | A1 | 2/2017 | Makarov |
| 2017/0307565 | A1 | 10/2017 | Clemmer |
| 2018/0138026 | A1 | 5/2018 | Stewart |
| 2018/0247805 | A1 | 8/2018 | Continetti et al. |
| 2018/0350575 | A1 | 12/2018 | Hock |
| 2019/0088459 | A1 | 3/2019 | Takahashi |
| 2019/0236142 | A1 | 8/2019 | Balakrishnan |
| 2019/0237288 | A1 * | 8/2019 | Platzgummer ...... H01J 37/3007 |
| 2020/0003739 | A1 | 1/2020 | Yamamoto et al. |
| 2020/0243317 | A1 | 7/2020 | Lopez-Hilfiker |
| 2021/0183638 | A1 | 6/2021 | Nishiguchi |
| 2021/0210332 | A1 | 7/2021 | Jarrold |
| 2021/0210335 | A1 | 7/2021 | Jarrold |
| 2021/0319994 | A1 | 10/2021 | Jarrell et al. |
| 2022/0013350 | A1 | 1/2022 | Jarrold et al. |
| 2023/0013173 | A1 | 1/2023 | Jarrold |
| 2023/0039701 | A1 | 2/2023 | Jarrold |
| 2023/0046906 | A1 | 2/2023 | Jarrold |
| 2023/0048598 | A1 | 2/2023 | Jarrold |
| 2024/0050895 | A1 | 2/2024 | Brown |
| 2024/0087868 | A1 | 3/2024 | Jarrold |

FOREIGN PATENT DOCUMENTS

| | | | |
|---|---|---|---|
| JP | H01235142 | A | 9/1989 |
| JP | H11144675 | | 5/1999 |
| JP | 2002-520799 | | 7/2002 |
| JP | 2007-506106 | | 3/2007 |
| JP | 2008186730 | A | 8/2008 |
| JP | 2011-507194 | A | 3/2011 |
| JP | 2014-165053 | A | 7/2014 |
| JP | 2014-122908 | A | 9/2014 |
| JP | 2016-522401 | A | 7/2016 |
| JP | 2019-056598 | A | 4/2019 |
| WO | 1998011244 | A2 | 3/1998 |
| WO | 1998011244 | A3 | 5/1998 |
| WO | 1999061601 | A2 | 12/1999 |
| WO | 2000/004568 | A1 | 1/2000 |
| WO | 2000028004 | A1 | 5/2000 |
| WO | 2000028061 | A1 | 5/2000 |
| WO | 2000028061 | A9 | 5/2000 |
| WO | 2001092551 | A2 | 12/2001 |
| WO | 2003042704 | A1 | 5/2003 |
| WO | 2005/081684 | A2 | 9/2005 |
| WO | 2006130474 | A2 | 12/2006 |
| WO | 2010135830 | A1 | 12/2010 |
| WO | 2012083031 | A1 | 6/2012 |
| WO | 2012116765 | | 9/2012 |
| WO | 2012145037 | A1 | 10/2012 |
| WO | 2016073850 | A1 | 5/2016 |
| WO | 2017162779 | A1 | 9/2017 |

(56) References Cited

FOREIGN PATENT DOCUMENTS

| | | | |
|---|---|---|---|
| WO | 2017190031 | A1 | 11/2017 |
| WO | 2018/109895 | A1 | 6/2018 |
| WO | 2018217778 | A1 | 11/2018 |
| WO | 2019118242 | A1 | 6/2019 |
| WO | 2019162687 | A1 | 8/2019 |
| WO | 2019231854 | A1 | 12/2019 |
| WO | 2023111538 | A1 | 6/2023 |
| WO | 2023111707 | A1 | 6/2023 |
| WO | 2023139351 | A1 | 7/2023 |
| WO | 2024023525 | A1 | 2/2024 |

OTHER PUBLICATIONS

PCT International Search Report and Written Opinion completed by the ISA/EP on Sep. 9, 2019 and issued in connection with PCT/US2019/035379.
PCT International Search Report and Written Opinion completed by the ISA/EP on Mar. 8, 2021 and issued in connection with PCT/US2020/065300.
PCT International Search Report and Written Opinion completed by the ISA/US on Apr. 5, 2021 and issued in connection with PCT/US2021/016435.
PCT International Search Report and Written Opinion completed by the ISA/US on Mar. 18, 2021 and issued in connection with PCT/US2021/016325.
PCT International Search Report and Written Opinion completed by the ISA/EP on Mar. 8, 2021 and issued in connection with PCT/US2020/065301.
Keifer, David et al., "Charge Detection Mass Spectrometry of Bacteriophage P22 Procapsid Distributions Above 20MDa", Rapid Communications in Mass Spectrometry, vol. 28, No. 5, 2014.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168, May 2015.
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Weiss, Victor U., et al., "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAVVectors: Characterization and Risk Assessment", Biomedicines 2014, 2, 80-97.
PCT International Search Report and Written Opinion completed by the ISA/US on Oct. 11, 2021 and issued in Connection with PCT/US2021/034480.
Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.
Kafle et al. "Understanding gas phase modifier interactions in rapid analysis by Differential Mobility-Tandem Mass Spectrometry", J Am Soc Mass Spectrom. 2014.25(7): pp. 1098-1113, especially: p. 7, para 2; p. 10, para 5; p. 11, para 1.
Kiss et al. "Size, weight and position: ion mobility spectrometry and imaging MS combined", Anal Bioanal Chem. 2011. 399: pp. 2623-2634, especially: p. 2626, col. 1, para 1.
Office Action from corresponding Korea Patent Application No. 10-2020-7037876, mailed May 16, 2024.
Office Action and Search Report for CN patent application No. 201980051696.1, dated Sep. 25, 2023. (translation appended).
Office Action, issued Jun. 23, 2023 for counterpart Japan Patent Application No. 2020-568469 (English Translation).
Office Action, issued Jan. 18, 2023 for counterpart Japan Patent Application No. 2020-568469 (English Translation).
Japanese Office Action dispatched Feb. 17, 2023 for application 2020-568389—11 pages.
European Office Action dated Mar. 3, 2023 for application 19732193.8—14 pages.
Japanese Office Action dispatched Jan. 31, 2023 for application 2020-568364—9 pages.
Japanese Office Action dispatched Jan. 24, 2023 for co-pending application 2021-527871—4 pages (Prior art reference Alexander Makarov has been previously submitted).
Japanese Office Action dispatched Jan. 18, 2023 for 2020-568469—16 pages (References 1, 2, 3 and 5 , and prior art document JP 2010-515210 English equivalent US 2013/327934A1, cited in this document have been previously submitted).
Japanese Office Action dated Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).
Japanese Office Action dispatched Jan. 6, 2023 for application 2020-568366—9 pages (References 1 and 2 and the Doussineau article cited in this document have been previously submitted).
Examination report No. 1 issued Oct. 21, 2022 in Australian Application No. 2019281255—4 pages.
European Office Action dated Sep. 9,2022 for application 19 702 775.8—5 pages.
European Office Action dated Sep. 2,2021 for application 19 707 901.5—5 pages.
Emerson, S., et al. "Hepatitis E Virus", Virology, vol. 2, Chapter 70; (4th ed., Lippincott-Raven Publishers).
Fields, Bernard, et al. "Parvoviridae: The Viruses and Their Replication" Virology, vol. 2, Chapter 69, pp. 2327-2359; 4th ed., Lippincott-Raven Publishers).
Katakura et al. "A New Concept of Isotope Separation using Ion Cyclotron Resonance in a Magnetic Field Having a Radial Component", Japanese Journal of Applied Physics, Japan Society of Applied Physics, JP, vol. 32, No. 5A, Part 01 (May 1, 1993), pp. 2167-2174, XP000413943, ISSN: 0021-4922, DOI: 10.1143/JJAP.32.2167 'abstract*.
Pin Li et al., "Progress in Exosome Isolation Techniques", Theranostics, vol. 7, No. 3, (Jan. 1, 2017), pp. 789-804, XP055417509, AU, ISSN 1838-7640, DOI: 10.7150/thno.18133.
First Office Action for Counterpart Chinese Patent Application No. 2022-521245 dated Mar. 7, 2024, 9 pages, with appended English language translation.
Supplemental European Search Report for counterpart European Patent Application No. 20874490.4 dated Oct. 10, 2023 (9 pages).
Brown, Brooke Ann, et al., Charge Detection Mass Spectrometry Measurements of Exosomes and other Extracellular Particles Enriched from Bovine Milk, Analytical Chemistry, Jan. 28, 2020.
Kosaka, Nobuyoshi, et al., "Versatile roles of extracellular vesicles in cancer," J Clin Invest. 2016;126(4):1163-1172. https://doi .org/10.1172/JCI81130.
PCT International Search Report and Written Opinion completed by the ISA/US on Mar. 8, 2021 and issued in connection with PCT/US2020/65300.
Extended European Search Report for copending application No. 21751374.6, dated Feb. 21, 2024.
Bernaud J et al. "Characterization of AAV vector particle stability at the single-capsid level." J. Biol. Phys., vol. 44, 2018, pp. 181-194, XP036492006.
Barnes L F et al. "Analysis of thermally driven structural changes, genome release, disassembly, and aggregation of recombinant AAV by CDMS." Molecular Therapy—Methods & Clinical Development, vol. 27, Dec. 1, 2022 (Dec. 1, 2022), pp. 327-356, XP093127574, GB, ISSN: 2329-0501, DOI: 10.1016/j.omtm.2022.10.008.
PCT International Search Report and Written Opinion completed by the ISA/US on Apr. 5, 2021 and issued in connection with PCT/US2021/016325.
Korean Office Action dated May 1, 2024 for co-pending application No. 10-2021-7019302.
Office Action and Search Report for co-pending Chinese Patent Application No. 201980079672.7, dated Nov. 1, 2023. (English translation appended).
Satoh, "Development of JMS-S3000: MALDI-TOF/TOF Utilizing a Spiral Ion Trajectory," JEOL News, vol. 45, No. 1, 34-37 (2010).

(56) References Cited

OTHER PUBLICATIONS

European Office Action dated Sep. 9, 2022 for application 19 702 771.7—5 pages.
PCT International Search Report and Written Opinion completed by the ISA/US on Aug. 26, 2022 and issued in connection with PCT/US2022/073503.
European Office Action dated Nov. 23, 2022 for application 19 702 773.3—5 pages.
European Office Action dated Jun. 26, 2024 and issued in connection with EP Patent Appln. No. 19707901.5, 8 pages.
Bot, Marek-Verfasser. "Gas-Phase Study of Dispersion-Bound Complexes." Gas-Phase Study of Dispersion-Bound Complexes, ETH Zurich, 2019. https://doi.org/10.3929/ethz-b-000424112.
English translation of a Final Office Action for Japanese Patent Appln. No. 2022-521245, dated Oct. 1, 2024, 9 pages.
English translation of an Office Action for Japanese Patent Appln. No. 2022-537360, dated Oct. 8, 2024, 3 pages.
English translation of an Office Action for Japanese Patent Appln. No. 2022-537367, dated Oct. 8, 2024, 6 pages.
European Office Action dated Dec. 9, 2024 and issued in connection with EP Appln. No. 20839500.4, 5 pages.
European Office Action dated Dec. 9, 2024 and issued in connection with EP Appln. No. 20839501.2, 5 pages.
Non-Final Office Action, mailed Sep. 29, 2024 and issued in connection with U.S. Appl. No. 17/781,483, 84 pages.
International Search Report and Written Opinion for copending application No. PCT/US2023/073631, dated Feb. 9, 2024.
PCT International Search Report and Written Opinion completed by the ISA/EP on Mar. 27, 2019 and issued in connection with PCT/US2019/013277.
PCT International Search Report and Written Opinion completed by the ISA/EP on Jul. 24, 2019 and issued in connection with PCT/US2019/013278.
PCT International Search Report and Written Opinion completed by the ISA/EP on Sep. 9, 2019 and issued in connection with PCT/US2019/013279.
PCT International Search Report and Written Opinion completed by the ISA/EP on Mar. 28, 2019 and issued in connection with PCT/US2019/013280.
PCT International Search Report and Written Opinion completed by the ISA/EP on Aug. 27, 2019 and issued in connection with PCT/US2019/013281.
PCT International Search Report and Written Opinion completed by the ISA/EP on Mar. 27, 2019 and issued in connection with PCT7US2019/013283.
PCT International Search Report and Written Opinion completed by the ISA/EP on Mar. 29, 2019 and issued in connection with PCT/US2019/013284.
PCT International Search Report and Written Opinion completed by the ISA/EP on Jul. 26, 2019 and issued in connection with PCT/US2019/013285.
PCT International Search Report and Written Opinion completed by the ISA/US on Jan. 12, 2016 and issued in connection with PCT/US2015/059463.
PCT International Search Report and Written Opinion completed by the ISA/US on Jun. 19, 2017 and issued in connection with PCT/US2017/030163.
PCT International Search Report and Written Opinion completed by the ISA/EP on Feb. 14, 2019 and issued in connection with PCT/US2018/051944.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 is Only Distantly Related to Other Known Primate Helper-Dependent Parvoviruses", Journal of Virology, vol. 73, pp. 939-947 (Feb. 1999).
Beuhler, et al., Threshold studies of secondary electron emission induced by macro-ion impact on solid surfaces. Nucl. Instrum. Methods. 170, 309-315 (1980).
Beuhler, et al., A study of the formation of high molecular weight water cluster ions (m/e < 59000) in expansion of ionized gas mixtures, J. Chem. Phys. 77,2549-2557 (1982).
Brancia, et al., Digital asymmetric waveform isolation (DAWI) in a digital linear ion trap. J Am. Soc Mass Spectrom. 1. 1530-1533 (2010).
Brown, C, et al. "Chimeric Parvovirus B19 Capsids for the Presentation of Foreign Epitopes",; Virology 198, pp. 477-488 (1994).
Burnham, et al. "Analytical Ultracentrifugation as an Approach to Characterize Recombinant Adeno-Associated Viral vectors", Human Gene Therapy Methods, vol. 26, No. 6; pp. 228-242, Oct. 15, 2015.
Chao, Hengjun, et al. "Several Log Increase in Therapeutic Transgene Delivery by Distinct Adeno-Associated Viral Serotype Vectors" Molecular Therapy vol. 2, No. 6, pp. 619-623 (Dec. 2000).
Chiorini, John A., et al. "Cloning of Adeno-Associated Virus Type 4 (AAV4) and Generation of Recombinant AAV4 Particles", Journal of Virology, vol. 71, pp. 6823-6833 (Sep. 1997).
Chiorini, John A., "Cloning and Characterization of Adeno-Associated Virus Type 5", Journal of Virology, vol. 73, DP-1309-1319 (Feb. 1999).
Chemushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Draper, Benjamin E., "The FUNPET a New Hybrid Ion Funnel-Ion Carpet Atmospheric Pressure Interface for the Simultaneous Transmission of a Broad Mass Range", Journal of the American Society of Mass Spectrometry 29, 2160-2172, Aug. 15, 2018.
Ding, et al., A simulation study of the digital ion trap mass spectrometer. Int. J. Mass Spectrom. 221, 117-138 (2002).
Ding, et al., A digital ion trap mass spectrometer coupled with atmospheric pressure ion sources. J Mass Spectrom. 69, 471-484 (2004).
Douglas D.J. Linear quadrupoles in mass spectrometry. Mass Spectrom. Rev. 28, 937-960 (2009).
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Heller, Manfred, et al. "Mass Spectrometry-Based Analytical Tools for the Molecular Protein Characterization of Human Plasma Lipoproteins", Proteomics 2005, 5, 2619-2630.
Elliott, Andrew G., et al. "Single Particle Analyzer of Mass: A Charge Detection Mass Spectrometer with a Multi-Detector Electrostatic lon Trap", International Journal of Mass Spectrometry, Elsevier Science Publishers, Amsterdam, NL, vol. 414, Jan. 15, 2017, pp. 45-55.
Fuerstenau et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human GeneTherap", .; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Grifman, M., et al. "Incorporation of Tumor-Targeting Peptides into Recombinant Adeno-associated Virus Capsids", .; Molecular Therapy, vol. 3, No. 6, pp. 964-975 (Jun. 2001).
Grinfeld, Dmitry, et al. "Space-Charge Effects in an Electrostatic Multireflection Ion Trap", European Journal of Mass Spectrometry, vol. 20, No. 2, Apr. 1, 2014 (Apr. 1, 2014), p. 131-142.

(56) References Cited

OTHER PUBLICATIONS

Hauck, B., et al. "Characterization of Tissue Tropism Determinants of Adeno-Associated Virus Type 1", Journal of Virology, vol. 77, No. 4, pp. 2768-2774 (Feb. 2003).
Hutchins, Patrick M., et al. "Quantification of HDL Particle Concentration by Calibrated lon Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using tmospheric pressure ion sources. Anal. Chem. 73, 4162-4170 (2001).
Botamanenko, Daniel, et al., "Ion-Ion Interactions in Charge Detection Mass Spectrometry", J Am Soc Mass Spectrom. Dec. 2019; 30(12): 2741-2749. doi:10.1007/s13361-019-02343-y.
Draper, Benjamin E., et al., "Real-Time Analysis and Signal Optimization for Charge Detection Mass Spectrometry", J. Am. Soc. Mass Spectrom. (2019) 30:898Y904.
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
PCT International Search Report and Written Opinion completed by the ISA/EP on Jul. 14, 2020 and issued in connection with PCT/US2020/029287.
PCT International Search Report and Written Opinion completed by the ISA/US on Nov. 23, 2020 and issued in Connection with PCT/US2020/052009.
PCT International Search Report and Written Opinion completed by the ISA/US on Jan. 24, 2021 and issued in connection with PCT/US2020/054975.
PCT International Search Report and Written Opinion completed by the ISA/EP on Apr. 18, 2019 and issued in connection with PCT/US2019/013251.
Contino, Nathan Colby "Ion trap charge detection mass spectrometry: Lowering limits of detection and improving signal to noise", ISBN:9781303535048, Jul. 30, 2013 (Jul. 30, 2013), Retrieved from the Internet: URL:https://search.proquest.com/docview/1468444320?accountid=29404.
Keifer, David Z., et al. "Charge detection mass spectrometry: weighing heavier things" The Analyst, vol. 142, No. 10, Jan. 1, 2017, pp. 1654-1671.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Hogan, J et al. "Optimized Electrostatic Linear Ion Trap for Charge Detection Mass Spectrometry" 2086-2095. American Society for Mass Spectrometry. Online. Jul. 9, 2018; Entire Document; DOI: 10.1007/s13361-018-2007-x.
Andrew G. Elliott et al, "Effects of Individual lon Energies on Charge Measurements in Fourier Transform Charge Detection Mass Spectrometry (FT-CDMS)", Journal of the American Society for Mass Spectrometry., US, (Nov. 14, 2018), doi:10.1007/s13361-018-2094-8, ISSN 1044-0305, XP055582125.
Koizumi et al., A novel phase-coherent programmable clock for high-precision arbitrary waveform generation applied o digital ion trap mass spectrometry Int. J_ Mass Spectrom_ 292,23-31 (2010).
Konenkov et al., Matrix methods for the calculation of stability diagrams in quadrupole mass spectrometry. J. Amer. Soc. Mass Spec. 13, 597-613 (2002).
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filter. Int. J_ Mass Spectrom. Ion Proc. 42, 3-10 (1982).
Martin, Stability of doubly charged alkali halide clusters. J_ Chem. Phys. 76, 5467-5469 (1982).
Miyamura, K., et al. "Parvovirus Particles as Platforms for Protein Presentation", National Academy of Sciences, vol. 1, No. 18, pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muzyczka, N., "Use of Adeno-Associated Virus as a General Transduction Vector for Mammalian Cells", Current Topics n Microbiology and Immunology, vol. 158, pp. 97-129 (1992).
Muramatsu, S., et al. "Nucleotide Sequencing and Generation of an Infectious Clone of Adeno-Associated Virus 3", Virology vol. 221; Article No. 0367; pp. 208-217 (1996).
Padron, Eric, et al. "Structure of Adeno-Associated Virus Type 4", Journal of Virology, vol. 79, No. 8, pp. 5047-5058 Apr. 2005).
Puttaraju, M., et al. "Spliceosome-mediated RNA trans-splicing as a tool for gene therapy", Nature Biotechnology, vol. 17, pp. 246-252 (Mar. 1999).
Nie et al., Frequency scan of a quadrupole mass analyzer in the third stability region for protein analysis. J. Chin. Chem_ Soc, 53, 47-52 (2006).
Paul et al., Das elekthsche massenfilter als massenspektromeler und isotopenlrenner. Z. Phys. 152, 143-182 (1958).
Paul, et al., Das elektrische massenfiller, Z. Phys. 140,262-273 (1955).
Pierson, Elizabeth E., et al., "Detection of Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth E., et al., Charge Detection Mass Spectrometry for Single lons with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Schlunegger et al., Frequency scan for the analysis of high mass ions generated by matrix-assisted laser esorption/ionization in a Paul trap_ Rapid Commun. Mass Spectrom. 13, 1792-1796 (1999).
Richards et al., A new operating mode for the quadrupole mass filler. Int. J. Mass Spectrom. Ion Phys. 12, 317-339 (1973).
Richards et al., Waveform parameter tolerances for the quadrupole mass filler with rectangular excitation. Int. J. Mass Spectrom. Ion Phys_ 15, 417-428 (1974).
Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.
Shinholt, Deven L, et al., "A Frequency and Amplitude Scanned Quadrupole Mass Filter for the Analysis of High m/z lons", Review of Scientific Instruments 85, 113109 (2014) (Received Sep. 11, 2014; accepted Oct. 17, 2014; published online Nov. 21, 2014).
Sobott et al., A tandem mass spectrometer for improved transmission and analysis of large macromolecular Assemblies. Anal. Chem. 74, 1402-1407 (2002).
Syed, et al., Quadrupole mass filter: Design and performance for operation in stability zone 3. J. Am. Soc. Mass Spectrom. 24, 1493-1500 (2013).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).

(56) References Cited

OTHER PUBLICATIONS

Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Srivastava, Arun, et al., "Nucleotide Sequence and Organization of the Adena-Associated Virus 2 Genome", Journal of Virology, vol. 45, No. 2, pp. 555-564 (Feb. 1983).
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Walters, Robert W., "Structure of Adeno-Associated Virus Serotype 5", Journal of Virology, vol. 78, No. 7, pp. 3361-3371 (Apr. 2004).
Wang, Lei, et al., "Expanding the Genetic Code", Annual Review of Biophysics and Biomolecular Structure, vol. 35, pp. 25-249 (2006).
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (AAV-2), a vector for human gene therapy", PNAS, vol. 99, No. 16, pp. 10405-10410 (Aug. 6, 2002).
Xiao, Weidong, et al., "Gene Therapy Vectors Based on Adeno-Associated Virus Type 1", Journal of Virology, vol. 73, No. 5, pp. 3994-4003 (May 1999).
Uetrecht et al., "Stability and Shape of Hepatitis B Virus Capsids In Vacuo", Angew. Chem. Int. Ed. 2008,47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Winger, Brian E., et al., "Observation and Implications of High Mass-to-Charge Ratio Ions from Electrospray Ionization Mass Spectrometry," 1993 American Society for Mass Spectrometry 4, 536-545.
Xiong, et al., The development of charge detection-quadrupole ion trap mass spectrometry driven by rectangular and triangular waves, Analyst 137, 1199-1204 (2012).
Yang, et al., Development of a palm portable mass spectrometer. J. Amer. Soc. Mass Spec. 19,1442-1448 (2008).
Yost, et al., Selected ion fragmentation with a tandem quadrupole mass spectrometer. J. Am. Chem. Soc. 100, 2274-2275(1978).
Bioconjugate Techniques; Hermanson; . Academic Press, 1st Edition (1996),. (book reference, chapter guide attached book/specific chapter(s) to be made available upon request).
PCT International Search Report and Written Opinion completed by the ISA/EP on Aug. 27, 2019 and issued in connection with PCT7US2019/035381.
PCT International Search Report and Written Opinion completed by the ISA/EP on Apr. 16, 2019 and issued in connection with PCT/US2019/013274.
Seiji Ogata et al. "Real-time Optimization Method for Optical Parameters of Ion Implanters." AIP Conf. Proc., vol. 866, 1 (2006): 433-436. https://doi.org/10.1063/1.2401549.
Martin F. Jarrold. "Applications of Charge Detection Mass Spectrometry in Molecular Biology and Biotechnology." Chem. Rev. 2022, 122, 7415-7441. DOI: 10.1021/acs.chemrev.1c00377.
Neustock, L.T. et al. "Inverse Design Tool for Ion Optical Devices using the Adjoint Variable Method." Sci Rep 9, 11031 (2019). https://doi.org/10.1038/s41598-019-47408-w.
Barnes, Lauren F et al. "Analysis of Recombinant Adenovirus Vectors by Ion Trap Charge Detection Mass Spectrometry: Accurate Molecular Weight Measurements beyond 150 MDa." Analytical chemistry vol. 94,3 (2022): 1543-1551. doi: 10.1021/acs.analchem.1 c02439.
Miller, Philip E et al. "The Quadrupole Mass Filter: Basic Operating Concepts." Journal of Chemical Education, vol. 63,7(1986): 617-622. DOI: 10.1021/ed063p617.
International Search Report for copending international application PCT/US2023/073710, mailed Jan. 17, 2024.
Japanese Office Action (including English translation) issued in App. No. JP2022537360, dated Oct. 8, 2024, 6 pages.
Doussineau, Tristan, et al. "Infrared multiphoton dissociation tandem charge detection-mass spectrometry of single megadalton electrosprayed ions." Review of Scientific Instruments 82.8 (2011).
Chinese Office Action (including English translation) issued in App. No. CN202080096842.5, dated Dec. 12, 2024, 19 pages.
Japanese Office Action (including English translation) issued in App. No. JP2022518995, dated Dec. 3, 2024, 6 pages.
Japanese Office Action (including English translation) issued in App. No. JP2022537367, dated Oct. 8, 2024, 11 pages.
Extended EP Search Report completed Aug. 29, 2024 and issued in connection with EP Appln. No. 24174366., 12 pages.
English translation of an Office Action for Japanese Patent Appln. No. 2022-547047, dated Aug. 1, 2024.

* cited by examiner

RADIALLY SEGMENTED ION GUIDE AND EXAMPLE APPLICATIONS THEREOF

CROSS-REFERENCE TO RELATED APPLICATION

This application claims the benefit of and priority to U.S. Provisional Patent Application Ser. No. 63/405,007, filed Sep. 9, 2022, the disclosure of which is incorporated herein by reference in its entirety.

GOVERNMENT RIGHTS

This invention was made with government support under GM131100 awarded by the National Institutes of Health. The United States Government has certain rights in the invention.

TECHNICAL FIELD

The present disclosure relates generally to transmission of charged particles to, within or exiting charged particle analysis instruments, and more specifically to devices for focusing charged particles within, transmitted to, or exiting from, charged particle analysis instruments.

BACKGROUND

In charged particle analysis instruments, charged particles are typically transported axially into, through, and/or out of the various instrument stages or components, i.e., along and about a central axis defined therethrough. In some such instruments, axial misalignment between instrument stages and/or between two or more components of an instrument stage may result in deviations in transmission of charged particles from along the central axis. In other such instruments, charged particles may not exit an instrument stage along the central axis but may instead exit the instrument stage with a radial offset relative to the central axis and, in some cases, also with an angular deviation relative to the central axis. In some such instruments, it may therefore be desirable to control the transmission of charge particles into, through, and/or out of one or more stages or components of a charged particle analysis instrument or system in a manner that focuses charged particles toward a central axis within a stage or of a following stage of the instrument or system.

SUMMARY

The present disclosure may comprise one or more of the features recited in the attached claims, and/or one or more of the following features and combinations thereof. In a first aspect, a charged particle guide may comprise a plurality of electrically conductive segments separate, and arranged radially spaced apart, from one another about an opening defined axially through the plurality of electrically conductive segments, the opening defining a central axis passing centrally and axially therethrough, the plurality of electrically conductive segments configured to receive charged particles at one end of the opening and to pass the received charged particles through an opposite end of the opening, at least one voltage source configured to produce and supply separately controllable voltages to each of the plurality of electrically conductive segments, and at least one control circuit configured to control the at least one voltage source to supply selected voltages to each of the plurality of electrically conductive segments to create an electric field within opening defined therethrough, the electric field configured to cause charged particles entering the one end of the opening along a first axial path relative to the central axis to exit the opposite end of the opening along a second axial path, different from the first axial path, relative to the central axis.

A second aspect includes the features of the first aspect, and wherein the first axial path is collinear with the central axis, and wherein the second axial path is radially offset from the central axis.

A third aspect includes the features of the first aspect, and wherein the second axial path is collinear with the central axis, and wherein the first axial path is parallel radially offset from the central axis.

A fourth aspect includes the features of the first aspect, and wherein the first axial path is radially offset from the central axis, and wherein the second axial path is radially offset from the first axial path and radially offset from the central axis.

A fifth aspect includes the features of the first through fourth aspects, and wherein the opening is defined by and between inner surfaces of each of the plurality of electrically conductive segments.

A sixth aspect includes the features of the fifth aspect, and wherein the inner surface of at least one of the plurality of electrically conductive segments is arcuate in shape.

A seventh aspect includes the features of the sixth aspect, and wherein the inner surface of each of the plurality of electrically conductive segments is arcuate in shape such that the opening is circular in cross-section.

An eighth aspect includes the features of the fifth aspect, and wherein the inner surface of each of the plurality of electrically conductive segments is non-curvilinear.

In a ninth aspect, a charged particle analysis system may comprise the charged particle guide of any of the first through eighth aspects, and a charged particle analysis stage having a charged particle inlet spaced axially apart from the opposite end of the opening, the charged particle inlet defining a central axis passing centrally and axially therethrough, wherein the charged particle guide is configured to guide charged particles exiting the opening thereof into the charged particle inlet of the charged particle analysis stage, wherein the central axis of the charged particle inlet of the charged particle analysis stage is radially offset from the central axis of the opening of the charged particle guide, and wherein the second axial path is collinear with the central axis of the charged particle inlet of the charged particle analysis stage such that the electric field created within the opening by the at least one control circuit is configured to guide charged particles exiting the opening of the charged particle guide toward the central axis of the charged particle inlet of the charged particle analysis stage.

A tenth aspect may include the features of the ninth aspect, and may further comprise a charged particle position detector configured to produce at least one detection signal corresponding to a radial position, relative to the central axis of the charged particle inlet of the charged particle analysis stage or relative to the central axis of the opening of the charged particle guide, and wherein the at least one control circuit is configured to select the voltages to create the electric field within the opening of the charged particle guide based on the at least one detection signal.

In an eleventh aspect, a charged particle analysis system may comprise the charged particle guide of any of the first through eighth aspects, and a charged particle analysis stage having a charged particle inlet spaced axially apart from the opposite end of the opening, the charged particle inlet defining a central axis passing centrally and axially therethrough, wherein the central axis of the charged particle inlet of the charged particle analysis stage is radially offset from the central axis of the opening of the charged particle guide, and wherein the electric field created within the opening by the at least one control circuit is configured to maximize the percentage of charged particles exiting the opening of the charged particle guide that enter the charged particle inlet of the charged particle analysis stage.

In a twelfth aspect, a charged particle analysis system may comprise first and second spaced-apart ion mirrors, and a charge detection cylinder positioned between the first and second ion mirrors, the first and second ion mirrors and the charge detection cylinder together defining an electrostatic linear ion trap (ELIT) configured to trap therein charged particles supplied by a source of charged particles such that trapped charged particles oscillate back and forth between the first and second ion mirrors each time passing through the charge detection cylinder, the ELIT defining a central axis passing centrally and axially through each of the first and second ion mirrors and the charge detection cylinder, wherein each of the first and second ion mirrors includes a plurality of axially spaced apart ion mirror electrodes each defining an electrode opening through which the central axis of the ELIT passes, wherein at least one of the mirror electrodes may comprise the charged particle guide of any of the first through eighth aspects, and wherein the central axis of the opening of the charged particle guide is radially offset from the central axis of the ELIT.

A thirteenth aspect may include the features of the twelfth aspect, and wherein the electric field created within the opening by the at least one control circuit is configured to guide charged particles exiting the opening of the charged particle guide toward and along the central axis of the ELIT.

A fourteenth aspect may include the features of the twelfth aspect, and wherein a charge is induced on the charge detection cylinder each time a charged particle passes therethrough, and wherein the charged particle analysis system further comprises a charge sensitive preamplifier having an input coupled to the charge detection cylinder and an output coupled to the at least one control circuit, the charge sensitive preamplifier responsive to each charged induced on the charge detection cylinder to produce a respective charge detection signal, and wherein the at least one control circuit is configured to be responsive to the charge detection signals to determine a trapping efficiency of the ELIT as a ratio of trapping events in which charged particles oscillate between the two ion mirrors for at least a predefined amount of a total trapping event time period and trapping events in which charged particles do not oscillate between the two ion mirrors for at least the predefined amount of the total trapping event time period, and wherein the at least one control circuit is configured to select the voltages to create the electric field configured to guide charged particles exiting the opening of the charged particle guide in a manner which maximizes the trapping efficiency.

In a fifteenth aspect, a charged particle analysis system may comprise a charged particle source having a charged particle outlet via which charged particles exit the charged particle source, the charged particle outlet defining a central axis passing centrally and axially therethrough, and the charged particle guide of any of the first through eighth aspects, wherein the one end of the opening of the charged particle guide is spaced axially apart from the charged particle outlet of the charged particle source, wherein the central axis of the charged particle outlet of the charged particle source is radially offset from the central axis of the opening of the charged particle guide, and wherein the electric field created within the opening by the at least one control circuit is configured to cause charged particles exiting the charged particle outlet of the charged particle source to exit the opening of the charged particle guide along an axial path that is collinear with or radially offset from the central axis of the charged particle guide.

In a sixteenth aspect, a charged particle analysis system may comprise a charged particle source having a charged particle outlet via which charged particles exit the charged particle source, the charged particle outlet defining a central axis passing centrally and axially therethrough, the charged particle guide of any of the first through eighth aspects, wherein the one end of the opening of the charged particle guide is spaced axially apart from the charged particle outlet of the charged particle source, and a charged particle analysis stage having a charged particle inlet spaced axially apart from the opposite end of the opening of the charged particle guide, the charged particle inlet defining a central axis passing centrally and axially therethrough, wherein the central axis of the opening of the charged particle guide is radially offset from at least one of the central axis of the charged particle outlet of the charged particle source and the central axis of the charged particle inlet of the charged particle analysis stage, and wherein the electric field created within the opening by the at least one control circuit is configured to guide charged particles exiting the charged particle outlet of the charged particle source into the charged particle inlet of the charged particle analysis stage.

A seventeenth aspect may include the features of the sixteenth aspect, and may further comprise a charged particle position detector configured to produce at least one detection signal corresponding to a radial position, relative to the central axis of the opening of the charged particle guide or relative to the central axis of the charged particle inlet of the charged particle analysis stage, and wherein the at least one control circuit is configured to select the voltages to create the electric field configured to guide charged particles exiting the opening of the charged particle guide along a predetermined path, relative to the central axis of the opening of the charged particle guide or the central axis of the charged particle inlet of the charged particle analysis stage, based on the at least one detection signal.

An eighteenth aspect may include the features of the seventeenth aspect, and wherein the charged particle position detector is positioned between the charged particle guide and the charged particle analysis stage, and is mounted to one of the charged particle guide and the charged particle analysis stage.

A nineteenth aspect may include the features of the sixteenth aspect, and may further comprise means for determining a percentage of charged particles exiting the charged particle outlet of the charged particle source that enter the charged particle inlet of the charged particle analysis stage, and wherein the at least one control circuit is configured to select the voltages to create the electric field configured to guide charged particles exiting the charged particle guide in a manner which maximizes the percentage of charged particles exiting the charged particle outlet of the charged particle source that enter the charged particle inlet of the charged particle analysis stage.

A twentieth aspect may include the features of the sixteenth aspect, and wherein the charged particle source includes a multi-pole transmission device configured to receive charged particles at a charged particle inlet thereof and to transmit the received charged particles through a charged particle outlet thereof, and an AC voltage source operatively coupled to the multi-pole transmission device and configured to apply an AC voltage to the multi-pole transmission device to guide the received charged particles through the charged particle outlet thereof, and wherein the at least one control circuit is configured to (i) control the at least one voltage source to sequentially supply each of a number of different sets of voltages to each of the plurality of electrically conductive segments, the number of different sets of voltages selected to create corresponding electric fields within the opening of the charged particle guide configured to guide charged particles entering the opening from the charged particle outlet of the multi-pole transmission device about a periphery of the central axis of the opening of the charged particle guide toward the central axis of the opening so as to focus charged particles exiting the opening of the charged particle guide about the central axis thereof, (ii) control the at least one charged particle analysis stage to measure mass-to-charge ratios of the charged particles exiting the charged particle guide for each of the number of different sets of voltages supplied by the at least one voltage source to produce a corresponding number of different sets of charged particle measurements, and (iii), average the measured mass-to-charge ratios of the charged particles in the number of different sets of charged particle measurements to produce a resulting set of mass-to-charge ratios of the received charged particles.

In a twenty first aspect, a charged particle analysis system may comprise a charged particle source having a charged particle outlet, a charged particle analysis stage having a charged particle inlet, a radially segmented charged particle guide positioned between the charged particle source and the charged particle analysis stage and including a plurality of electrically conductive segments separate from, and arranged radially spaced apart from, one another about an opening defined through the plurality of radially arranged electrically conductive segments, at least one voltage source configured to produce and supply separately controllable voltages to each of the plurality of electrically conductive segments, and a control circuit configured to control the at least one voltage source to supply voltages to each of the plurality of electrically conductive segments, the voltages selected to create an electric field within the opening and configured to guide charged particles exiting the charged particle outlet of the charged particle source into the charged particle inlet of the charged particle analysis stage.

A twenty second aspect include the features of the twenty first aspect, and wherein the charged particle analysis stage defines a first longitudinal axis extending centrally through the charged particle inlet, and wherein the opening of the radially segmented charged particle guide defines a second longitudinal axis extending centrally therethrough, and wherein the first longitudinal axis is radially offset from the second longitudinal axis, and wherein the created electric field is configured to guide charged particles exiting the charged particle outlet of the charged particle source into the charged particle inlet of the charged particle analysis stage along the first longitudinal axis.

A twenty third aspect includes the features of the twenty second aspect, and wherein the charged particle source defines a third longitudinal axis extending centrally through the charged particle outlet, and wherein the charged particles exit the charged particle source along the third longitudinal axis.

A twenty fourth aspect includes the features of the twenty third aspect, and wherein the second longitudinal axis is collinear with the third longitudinal axis.

A twenty fifth aspect includes the features of the twenty third aspect, and wherein the third longitudinal axis is radially offset from the second longitudinal axis and from the first longitudinal axis.

A twenty sixth aspect includes the features of the twenty second aspect, and wherein the charged particle source defines a third longitudinal axis extending centrally through the charged particle outlet, and wherein the charged particles exit the charged particle source along a path that is radially offset from the third longitudinal axis.

A twenty seventh aspect includes the features of the twenty sixth aspect, and wherein the second longitudinal axis is collinear with the third longitudinal axis.

A twenty eighth aspect includes the features of the twenty sixth aspect, and wherein the third longitudinal axis is radially offset from the second longitudinal axis and from the first longitudinal axis.

A twenty ninth aspect includes the features of the twenty first aspect, and wherein the charged particle analysis stage defines a first longitudinal axis extending centrally through the charged particle inlet, and wherein the opening of the radially segmented charged particle guide defines a second longitudinal axis extending centrally therethrough, and wherein the first longitudinal axis is collinear with the second longitudinal axis, and wherein the created electric field is configured to guide charged particles exiting the charged particle outlet of the charged particle source into the charged particle inlet of the charged particle analysis stage along the first longitudinal axis.

A thirtieth aspect includes the features of the twenty ninth aspect, and wherein the charged particle source defines a third longitudinal axis extending centrally through the charged particle outlet, and wherein the charged particles exit the charged particle source along the third longitudinal axis, and wherein the third longitudinal axis is radially offset from the second longitudinal axis.

A thirty first aspect includes the features of the twenty ninth aspect, and wherein the charged particle source defines a third longitudinal axis extending centrally through the charged particle outlet, and wherein the charged particles exit the charged particle source along a path that is radially offset from the third longitudinal axis.

A thirty second aspect includes the features of the thirty first aspect, and wherein the third longitudinal axis is radially offset from the second longitudinal axis.

A thirty third aspect includes the features of the thirty first aspect, and wherein the third longitudinal axis is collinear with the second longitudinal axis.

A thirty fourth aspect includes the features of the thirty first aspect, and wherein the charged particle analysis stage defines a first longitudinal axis extending centrally through the charged particle inlet, and wherein the opening of the radially segmented charged particle guide defines a second longitudinal axis extending centrally therethrough, and wherein the first longitudinal axis is collinear with the second longitudinal axis, and wherein the created electric field is configured to guide charged particles exiting the charged particle outlet of the charged particle source into the charged particle inlet of the charged particle analysis stage along a path that is radially offset from the first longitudinal axis.

A thirty fifth aspect includes the features of the thirty fourth aspect, and wherein the charged particle source defines a third longitudinal axis extending centrally through the charged particle outlet, and wherein the charged particles exit the charged particle source along the third longitudinal axis.

A thirty sixth aspect includes the features of the thirty fifth aspect, and wherein the second longitudinal axis is collinear with the third longitudinal axis.

A thirty seventh aspect includes the features of the thirty fifth aspect, and wherein the third longitudinal axis is radially offset from the second longitudinal axis and from the first longitudinal axis.

A thirty eighth aspect includes the features of the thirty fourth aspect, and wherein the charged particle source defines a third longitudinal axis extending centrally through the charged particle outlet, and wherein the charged particles exit the charged particle source along a path that is radially offset from the third longitudinal axis.

A thirty ninth aspect includes the features of the thirty eighth aspect, and wherein the second longitudinal axis is collinear with the third longitudinal axis.

A fortieth aspect includes the features of the thirty eighth aspect, wherein the third longitudinal axis is radially offset from the second longitudinal axis and from the first longitudinal axis.

A forty first aspect includes the features of the twenty first aspect, and wherein the charged particle analysis stage defines a first longitudinal axis extending centrally through the charged particle inlet, and wherein the opening of the radially segmented charged particle guide defines a second longitudinal axis extending centrally therethrough, and wherein the second longitudinal axis is radially offset from the first longitudinal axis, and wherein the created electric field is configured to guide charged particles exiting the charged particle outlet of the charged particle source into the charged particle inlet of the charged particle analysis stage along a path that is radially offset from the first longitudinal axis.

A forty second aspect includes the features of the forty first aspect, and wherein the charged particle source defines a third longitudinal axis extending centrally through the charged particle outlet, and wherein the charged particles exit the charged particle source along the third longitudinal axis, and wherein the third longitudinal axis is radially offset from the second longitudinal axis.

A forty third aspect includes the features of the forty first aspect, and wherein the charged particle source defines a third longitudinal axis extending centrally through the charged particle outlet, and wherein the charged particles exit the charged particle source along a path that is radially offset from the third longitudinal axis.

A forty fourth aspect includes the features of the forty third aspect, and wherein the third longitudinal axis is radially offset from the second longitudinal axis.

A forty fifth aspect includes the features of the forty third aspect, and wherein the third longitudinal axis is collinear with the second longitudinal axis.

A forty sixth aspect includes the features of any of the twenty first through forty third aspects, and may further comprise a charged particle position detector configured to produce at least one detection signal corresponding to a radial position, relative to a first longitudinal axis extending centrally through the charged particle analysis stage or relative to a second longitudinal axis extending centrally through the radially segmented charged particle guide, and wherein the control circuit is configured to select the voltages to create the electric field configured to guide charged particles exiting the radially segmented charged particle guide along a predetermined path, relative to at least one of the first or the second longitudinal axis, based on the at least one detection signal.

A forty seventh aspect may include the features of the forty sixth aspect, and wherein the charged particle position detector is positioned between, but not mounted to either of, the radially segmented charged particle guide and the charged particle analysis stage.

A forty eighth aspect includes the features of the forty sixth aspect, and wherein the charged particle position detector is positioned between the radially segmented charged particle guide and the charged particle analysis stage, and is mounted to the radially segmented charged particle guide.

A forty ninth aspect includes the features of the forty sixth aspect, and wherein the charged particle position detector is positioned between the radially segmented charged particle guide and the charged particle analysis stage, and is mounted to the charged particle analysis stage.

A fiftieth aspect includes the features of any of the twenty first through twenty sixth aspects, and may further comprise means for determining a percentage of charged particles exiting the charged particle outlet of the charged particle source that enter the charged particle inlet of the charged particle analysis stage, and wherein the control circuit is configured to select the voltages to create the electric field configured to guide charged particles exiting the radially segmented charged particle guide in a manner which maximizes the percentage of charged particles exiting the charged particle outlet of the charged particle source that enter the charged particle inlet of the charged particle analysis stage.

In a fifty first aspect, a charged particle analysis system may comprise a charged particle source configured to generate charged particles, an electrostatic linear ion trap (ELIT) configure to receive and trap therein charged particles generated by the charged particle source, the ELIT including two spaced apart ion mirrors and a charge detection cylinder positioned between the two ion mirrors, the two ion mirrors and the charged detection cylinder together defining a first axis passing centrally therethrough, each of the two ion mirrors including a plurality of axially spaced apart ion mirror electrodes each defining an electrode opening therethrough, at least one of the ion mirror electrodes of at least one of the two ion mirrors comprising a plurality of electrically conductive segments separate from, and arranged radially spaced apart from, one another about a corresponding electrode opening defined through the plurality of radially arranged electrically conductive segments, the corresponding electrode opening defined through the at least one radially segmented ion mirror electrode defining a second axis passing centrally therethrough and radially offset from the first axis, at least one voltage source configured to produce and supply separately controllable voltages to each of the plurality of ion mirror electrodes of each of the two ion mirrors and to each of the plurality of electrically conductive segments of the at least one of the ion mirror electrodes, and a control circuit configured to control the at least one voltage source to supply selected voltages to the electrodes of each of the two ion mirrors to create first electric fields within each of the two ion mirrors to cause charged particles trapped in the ELIT to travel along the first axis, and to supply selected voltages to each of the plurality of electrically conductive segments to create a second electric field within the corresponding electrode opening of the at least one radially segmented ion mirror electrode configured to cause charged particles to pass therethrough along the first axis offset from the second axis defined centrally through the opening of the at least one radially segmented ion mirror electrode.

A fifty second aspect may include the features of the fifty first aspect, and wherein the first and second electric fields are configured to cause charged particles trapped in the ELIT during a trapping event to oscillate back and forth between the two ion mirrors each time passing through the charge detection cylinder to induce a corresponding charge thereon, and wherein the charged particle analysis system further includes a charge sensitive preamplifier having an input coupled to the charge detection cylinder and an output coupled to the control circuit, the charge sensitive preamplifier responsive to each corresponding charged induced on the charge detection cylinder to produce a respective charge detection signal, and wherein the control circuit is configured to be responsive to the charge detection signals to determine a trapping efficiency of the ELIT as a ratio of trapping events in which charged particles oscillate between the two ion mirrors for at least a predefined amount of a total trapping event time period and trapping events in which charged particles do not oscillate between the two ion mirrors for at least the predefined amount of the total trapping event time period, and wherein the control circuit is configured to select the voltages to create the electric field configured to guide charged particles exiting the radially segmented charged particle guide in a manner which maximizes the trapping efficiency.

In a fifty third aspect, a charged particle analysis system may comprise a charged particle source configured to generate charged particles from a sample, the charged particle source including a multi-pole charged particle transmission device having a charged particle inlet receiving the generated charged particles and configured to transmit the generated charged particles through a charged particle outlet thereof, an AC voltage source operatively coupled to the multi-pole charged particle transmission device and configured to apply an AC voltage to the multi-pole charged particle transmission device to guide the generated charged particles through the charged particle outlet, at least one charged particle analysis stage having a charged particle inlet, a radially segmented charged particle guide positioned between the charged particle source and the at least one charged particle analysis stage and including a plurality of electrically conductive segments separate from, and arranged radially spaced apart from, one another about an opening defined through the plurality of radially arranged electrically conductive segments, the opening defining a first longitudinal axis centrally therethrough, at least one voltage source configured to produce and supply separately controllable voltages to each of the plurality of electrically conductive segments, and a control circuit configured to (i) control the at least one voltage source to sequentially supply each of a number of different sets of voltages to each of the plurality of electrically conductive segments, the number of different sets of voltages selected to create corresponding electric fields within the opening configured to guide charged particles entering the opening from the charged particle outlet of the multi-pole charged particle transmission device about a periphery of the first longitudinal axis toward the first longitudinal axis so as to focus charged particles exiting the opening of the radially segmented charged particle guide about the first longitudinal axis, (ii) control the at least one charged particle analyzer to measure mass-to-charge ratios of the charged particles exiting the radially segmented charged particle guide for each of the number of different sets of voltages supplied by the at least one voltage source to produce a corresponding number of different sets of charged particle measurements, and (iii), average the measured mass-to-charge ratios of the charged particles in the number of different sets of charged particle measurements to produce a resulting set of mass-to-charge ratios of the generated charged particles.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to various embodiments and applications of a radially-segmented charged particle guide controllable by selective determination and application of DC voltages to the various segments to cause charged particles entering the guide along one axis to exit the guide along another axis for the purpose of focusing charged particles along a selected axis within or between stages of charged particle analysis systems. For purposes of this disclosure, the phrase "charged particle detection event" is defined as detection of a charge induced on a charge detector of an electrostatic linear ion trap (ELIT) by a charged particle passing a single time through the charge detector, and the phrase "charged particle measurement event" is defined as a collection of charged particle detection events resulting from oscillation of a charged particle back and forth through the charge detector a selected number of times or for a selected time period. As the oscillation of a charged particle back and forth through the charge detector results from controlled trapping of the charged particle within the ELIT, as will be described in detail below, the phrase "charged particle measurement event" may alternatively be referred to herein as a "charged particle trapping event" or simply as a "trapping event," and the phrases "charged particle measurement event," "charged particle trapping event", "trapping event" and variants thereof shall be understood to be synonymous with one another. For purposes of this disclosure, the terms "ion" and "charged particle," and variations thereof, will be understood to be synonymous. The term "ion" may thus be substituted for the term "charged particle" in any of the above definitions.

Figure 1A:
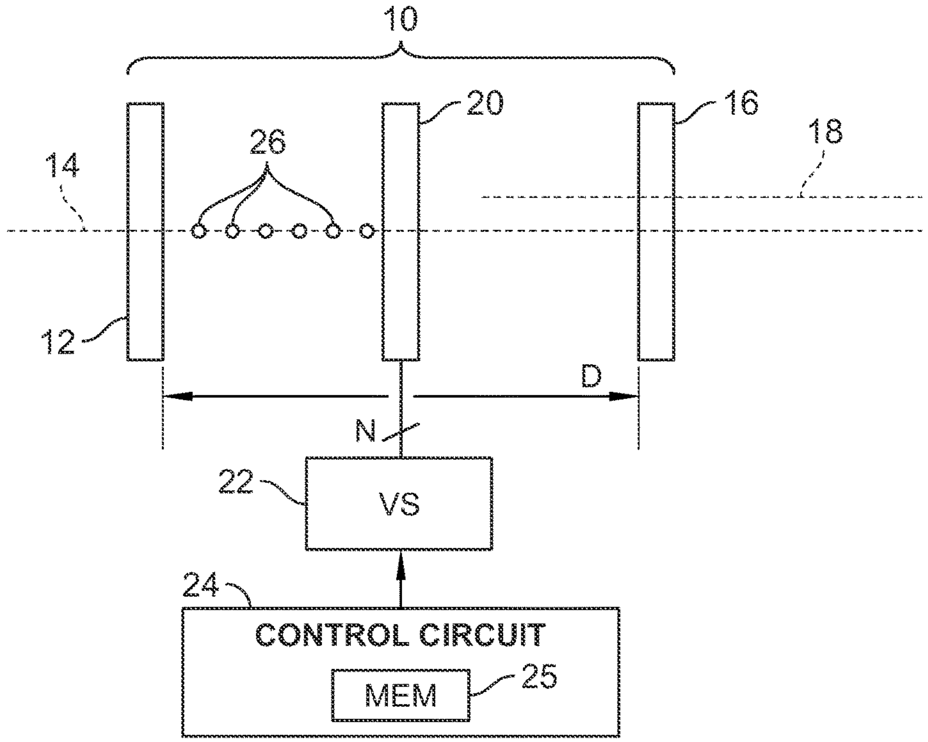
FIG. 1A is a simplified side-view diagram of a portion of a charged particle analysis system including a radially segmented charged particle guide, positioned between two axially misaligned stages of the system, for focusing charged particles exiting the upstream stage to the inlet of the downstream stage along the central axis of the downstream stage.

Referring now to FIG. 1A, a charged particle analysis system 10 is shown and includes a charged particle source 12 separated by a distance D from a charged particle analysis stage 16. A central, longitudinal axis 14 is defined through the charged particle source 12, and a central, longitudinal axis 18 is defined through the charged particle analysis stage 16, wherein the axes 14, 18 are axially misaligned with and relative to one another, i.e., wherein the axes 14, 18 are non-collinear. A radially segmented charged particle guide 20 is positioned between the axially misaligned charged particle source 12 and charged particle analysis stage 16, and in the embodiment illustrated in FIG. 1A the longitudinal axis 14 passes centrally through the radially segmented charged particle guide 20 such that the axis 14 represents the central, longitudinal axis defined through each of the charged particle source 12 and the radially segmented charged particle guide 20. The charged particle analysis system 10 further illustratively includes a voltage source (VS) 22 operatively coupled between at least one control circuit 24 and the radially segmented charged particle guide 20, wherein the voltage source 22 is configured to apply any number, N, of different voltages to the radially segmented charged particle guide 20, where N may be any positive integer. It will be understood that additional voltage sources will typically be operatively coupled between the control circuit(s) 24 and each of the charged particle source 12 and the charged particle analysis stage 16, and may be controlled in a conventional manner to produce one or more suitable voltages for controlling operation of the charged particle source 12 and, in some embodiments, operation of the charged particle analysis stage 16.

The at least one control circuit 24 may be conventional and include a single control circuit or multiple control circuits, wherein the term "control circuit" means, for purposes of this document, a decision-making circuit configured to be programmed and/or manually controlled to control operation of the voltage sources 22. In some embodiments, the decision-making circuit may be or include at least one conventional microprocessor or microcontroller and a memory unit 25 having instructions stored therein which are executable by the microprocessor(s) or microcontroller(s) to control operation of the voltage source VS. In alternate embodiments, the decision making circuit may be or include application-specific digital and/or analog circuitry designed or otherwise configured to control operation of the voltage source 22.

The charged particle source 12 may illustratively include any conventional device or apparatus for generating charged particles (i.e., ions) from a sample. As one illustrative example, which should not be considered to be limiting in any way, the charged particle source 12 may be or include a conventional electrospray ionization source, a matrix-assisted laser desorption ionization (MALDI) source or other conventional instrument or device configured to generate charged particles from a sample in solution, gas or solid form. The sample from which the ions are generated may be or include any biological or other material in solution or in solid form depending upon the source 12. In some embodiments, the charged particle source 12 may further include one or more devices and/or instruments for separating, collecting, filtering, guiding, controlling/setting energy, fragmenting and/or normalizing or shifting charge states of charged particles according to one or more molecular characteristics. As one non-limiting example of such an additional device or instrument that may be included in, or as part of the charged particle source 12, a mass spectrometer may be implemented to separate the generated charged particles according to mass-to-charge ratio prior to exit from the charged particle exit 14 of the charged particle source 12. Such a mass spectrometer may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, orbitrap, or the like.

The charged particle analysis stage 16 may illustratively be or include any conventional device or sequential combination of conventional devices configured to separate, collect, filter, control/set energy, fragment and/or normalize or shift charge states of charged particles according to one or more molecular characteristics and/or to measure one or more molecular characteristics and/or charge characteristics of charged particles. In one example embodiment, the charged particle analysis stage 16 may be or include at least one conventional mass spectrometer or mass analyzer configured to separate and detect charged particles according to mass-to-charge ratio. Alternatively or additionally, the charged particle analysis stage 16 may be or include at least one mobility device configured to separate and detect charged particles according to ion mobility. Alternatively or additionally, the charged particle analysis stage 16 may be or include at least one electrostatic linear ion trap (ELIT) and/or orbitrap configured to simultaneously measure mass-to-charge ratios and charge magnitudes of charged particles (from which charged particle mass can then be directly determined). In some embodiments, the charged particle analysis stage 16 may be or include a charge particle collection structure, e.g., in the form of a conventional charged particle collection target such as a plate, pad or the like, configured to collect thereon charged particles exiting the radially segmented charged particle guide 20. In some such embodiments, the charged particle collection target may include a charged particle medium disposed thereon and configured to promote and/or preserve collection of charged particles on the target. Those skilled in the art will recognize other examples of conventional devices or instruments, which may be or be included in the charged particle analysis stage 16, and it will be understood that such other examples are intended to fall within the scope of this disclosure. It will be further understood that none of the foregoing examples should be considered to be limiting in any way.

Figure 2:
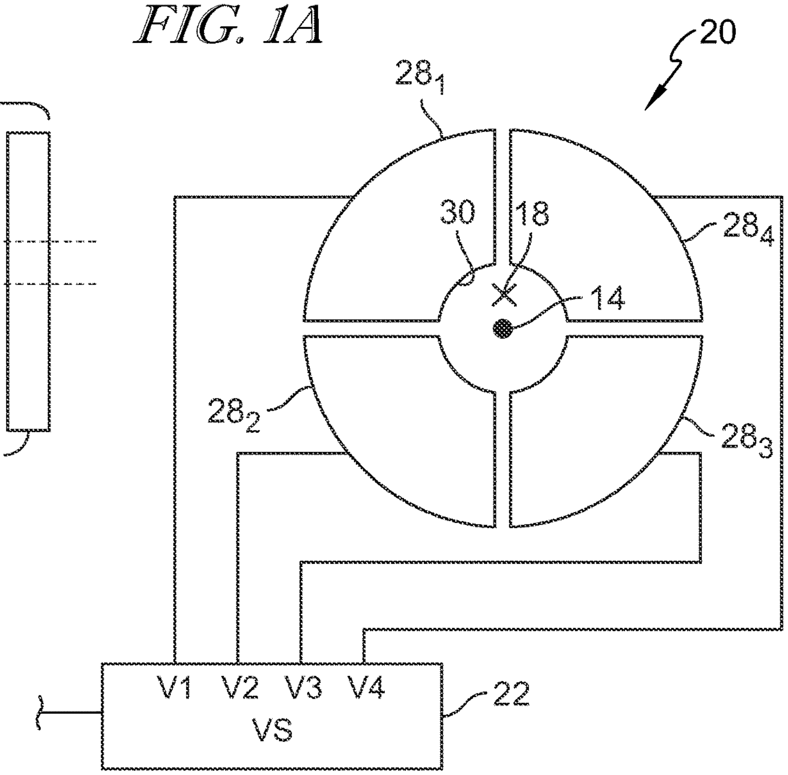
FIG. 2 is a simplified end view of an embodiment of the radially segmented charged particle guide of FIGS. 1A and 1B, in the form of a four-segment device with each segment operably coupled to a different amplitude-controllable voltage output of a DC voltage source.

Referring now to FIG. 2, an end-view is shown of an embodiment of the radially segmented charged particle guide 20 and corresponding configuration of the voltage source 22 operatively coupled thereto. In the illustrated embodiment, the radially segmented charged particle guide 20 includes four arcuate segments $28_1$-$28_4$ radially separated from one another and defining a central opening 30 therethrough. In the illustrated embodiment, the spaces separating adjacent ones of the arcuate segments $28_1$-$28_4$ are the same such that the radial distances between adjacent arcuate segments $28_1$-$28_4$ are equal to one another. In some embodiments, the inner and outer surfaces of the segments $28_1$-$28_4$ are arcuate in shape as depicted by example in FIG. 2, although in alternate embodiments only the inner surfaces, i.e., the inwardly-facing surfaces, of the segments $28_1$-$28_4$ may be arcuate in shape. In the illustrated embodiment, the arcuate shapes of at least the inner surfaces of the segments $28_1$-$28_4$ together define a generally circular opening 30, i.e., such that the opening 30 has a circular cross-sectional shape, although in alternate embodiments the arcuate shapes of at least the inner surfaces of the segments $28_1$-$28_4$ may configured to define a non-circular opening 30 having at least one curvilinear surface portion. In still other embodiments, the inner surface of one or more of the segments $28_1$-$28_4$ may have a non-arcuate shape, e.g., planar or other shape(s), such that at least a portion of the cross-sectional shape of the resulting opening 30 is not curved. In such embodiments, example cross-sectional shapes of the opening 30 may include, but are not limited to, square, rectangular, triangular or the like. In any case, the central, longitudinal axis 14 extends centrally through the opening 30.

The voltage source 22 depicted in FIG. 2 is illustratively configured to produce four separate DC voltages V1, V2, V3 and V4, wherein the V1 output is electrically connected to the radial segment $28_1$, the V2 output is electrically connected to the radial segment $28_2$, the V3 output is electrically connected to the radial segment $28_3$ and the V4 output is electrically connected to the radial segment $28_4$. In alternate embodiments, the radially segmented charged particle guide 20 may include any number of segments radially spaced apart from one another to define a central opening therethrough, and the voltage source 22 may be configured to correspondingly produce any number of separate DC voltages.

In the embodiment illustrated by example in FIG. 1A, charged particles 26 generated by the charged particle source 12 exit the charged particle source 12 along the central, longitudinal axis 14, i.e., such that the charged particles 26 exiting the charged particle source 12 travel along a path that is collinear with the central, longitudinal axis 14. Because the central, longitudinal axis 18 defined through the charged particle analysis stage 16 is not collinear with the axis 14, the charged particles 26 will, in the absence of the radially segmented charged particle guide 20 (and controlled as described below), thus enter the charged particle stage 16 off axis, if at all. Indeed, if the distance D is great enough and the charged particles 26 exit the charged particle source 12 along the axis 14 but at a sufficiently large angle relative to the axis 14, the charged particles 26 may sufficiently diverge from the axis 18 and not enter a charged particle inlet, e.g., orifice, of the charged particle analysis stage 16. However, by controlling the voltage source 22 to apply a corresponding potential shift to each radial segment $28_1$-$28_4$, the charged particles 26 entering the radially segmented charged particle guide 20 along the central, longitudinal axis 14 can be redirected, i.e., guided or focused, by a resulting electric field established in the opening 30 by the potential shift to exit the radially segmented charged particle guide 20 at a point or position relative to the central, longitudinal axis 14 that is aligned with the central, longitudinal axis 18 of the charged particle analysis stage 16, i.e., such that the charged particles 26 exit the radially segmented charged particle guide 20 along a path that is collinear with the central, longitudinal axis 18 of the charged particle analysis stage 16.

As depicted by example in FIG. 2, the charged particle source 12 and the charged particle analysis stage 16 are misaligned relative to one another such that the central, longitudinal axis 18 defined through the charged particle analysis stage 16 is shifted in the upwards direction relative to the central, longitudinal axis 14 defined through the charged particle source 12 and through the radially segmented charged particle guide 20. In order to direct the charged particles 26 to exit the radially segmented charged particle guide 20 along a path that is collinear with the central, longitudinal axis 18 of the charged particle analysis stage 16, V2 and V3 should have the same magnitude, V1 and V4 should have the same magnitude, and the magnitude of V2 and V3 should be greater than the magnitude of V1 and V4 by an amount which will create an electric field within the opening 30 which drives the charged particles 26 from the travel path that is collinear with the axis 14 to the travel path that is collinear with the axis 18. In other words, relative to typical, equal voltages of V1-V4 at which the voltage source 22 would be operated to create an electric field within the opening 30 configured to pass charged particles centrally through the radially segmented charged particle guide 20, i.e., along the axis 14, a negative ΔV will be applied by both of the voltages V1 and V4 to the radial segments $28_1$ and $28_4$ respectively, and a positive ΔV will be applied by both of the voltages V2 and V3 to the radial segments $28_2$ and $28_3$ respectively, wherein the magnitudes of the negative and positive ΔV's will be selected so as to establish a modified electric field within the opening 30 which causes the charged particles 26 to exit the radially segmented charged particle guide 20 along a path that is collinear with the axis 18.

Figure 1B:
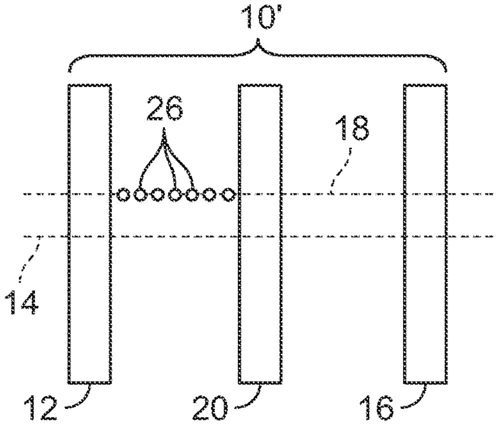
FIG. 1B is a simplified side-view diagram of a portion of another charged particle analysis system including a radially segmented charged particle guide, positioned between two stages of the system, for focusing charged particles exiting the upstream stage along an axis that is radially offset from the central axis of the upstream stage to the inlet of the downstream stage along the central axis of the downstream stage.

Turning now to FIG. 1B, the opposite condition is depicted with respect to the charged particle source 12 and the charged particle analysis stage 16 in a system 10' in which the axis 14 passing centrally through the charged particle source 12 and the radially segmented charged particle guide 20 also passes centrally through the charged particle analysis stage 16, but in which the charged particles exit the charged particle source 12 along the path 18 that parallel with, but shifted in the upwards direction relative to, the axis 14, as also illustrated by example in FIG. 2. In this example, in order to direct the charged particles 26 to exit the radially segmented charged particle guide 20 along a path that is collinear with the axis 14, V2 and V3 should have the same magnitude, V1 and V4 should have the same magnitude, and the magnitude of V1 and V4 should be greater than the magnitude of V2 and V3 by an amount which will create an electric field within the opening 30 which will drive the charged particles 26 from the travel path 18 that is parallel to, but offset from, the axis 14 to the travel path that is collinear with the axis 14. In other words, relative to typical, equal voltages of V1-V4 at which the voltage source 22 would be operated to pass charged particles centrally through the radially segmented charged particle guide 20, i.e., along the axis 14, a positive ΔV will be applied by both of the voltages V1 and V4 to the radial segments $28_1$ and $28_4$ respectively, and a negative ΔV will be applied by both of the voltages V2 and V3 to the radial segments $28_2$ and $28_3$ respectively, wherein the magnitudes of the negative and positive ΔV's will be selected so as to establish a modified electric field within the opening 30 which causes the charged particles 26 to exit the radially segmented charged particle guide 20 along the central, longitudinal axis 14.

It will be understood that the embodiments illustrated in FIGS. 1A and 1B are provided only by way of example, and should not be considered to be limiting in any way, and that in alternate embodiments the radially segmented charged particle guide 20 may include more or fewer radial segments and the voltage source 22 may be configured to produce correspondingly more or fewer DC voltages. It will be further understood that in alternate embodiments, the voltages V1-V4 may be controlled to cause charged particles entering the radially segmented charged particle guide 20 in the axial direction along any path to exit the radially segmented charged particle guide 20 in the axial direction along a different path. It will be further understood that, in some embodiments, the radial segments themselves may be offset from one another in non-uniform ways. For example, any one or more of the segments may be offset vertically, horizontally, to the right, and/or to the left relative to one or more of the remaining segments and/or relative to the longitudinal axis extending through the guide 20, and that in such embodiments potential offsets, i.e., ΔV's, can be determined which cause charged particles to exit the guide 20 along any desired path.

Figure 3A:
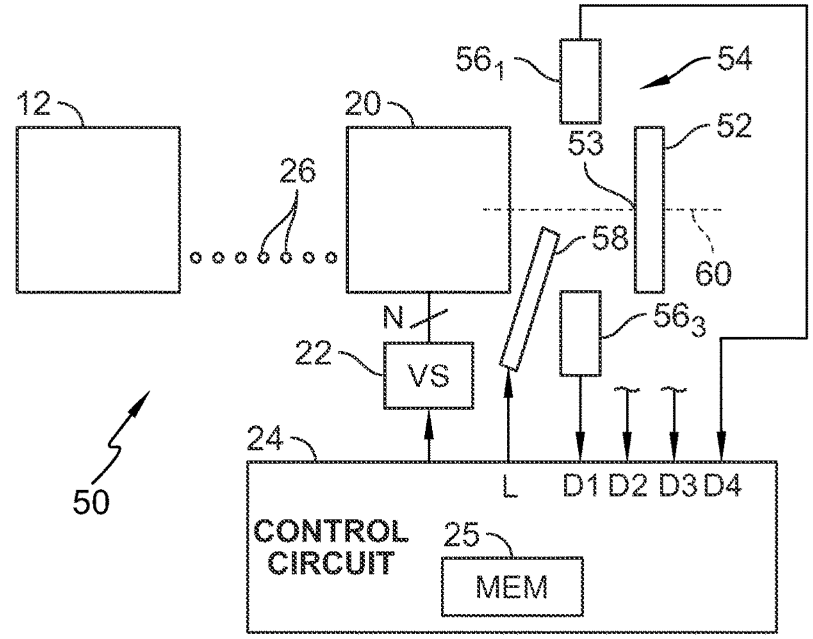
FIG. 3A is a simplified side-view diagram of an embodiment of a charged particle analysis system including the radially segmented charged particle guide illustrated by example in FIG. 2 for focusing charged particles exiting an upstream charged particle source to a selected position or area of a charged particle inlet of a downstream charged particle analysis stage, and further including an embodiment of a charged particle position detector positioned between the charged particle outlet of the charged particle guide and the charged particle analysis stage.
Figure 3B:
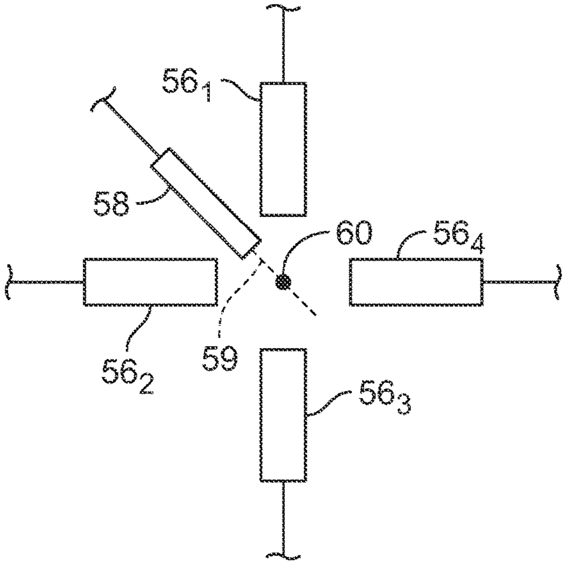
FIG. 3B is a simplified end view of the charged particle position detector of FIG. 3A.
Figure 3C:
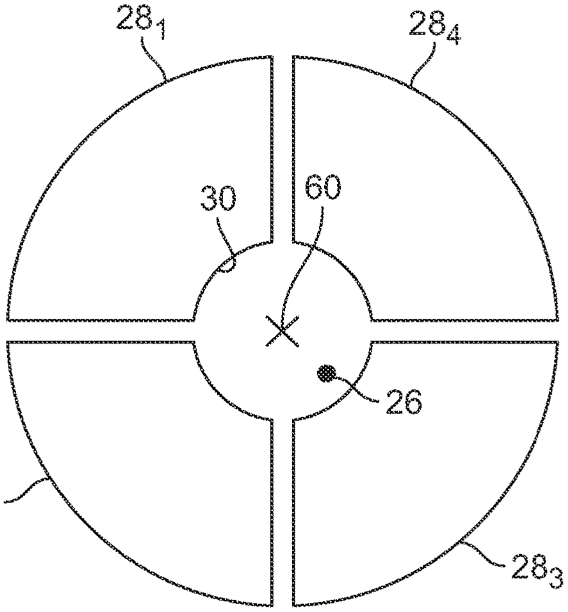
FIG. 3C is a simplified end view of the radially segmented charged particle guide of FIG. 3A, illustrating example focusing of a charged particle entering off-axis into the charged particle inlet to the central, longitudinal axis of the charged particle outlet.
Figure 4A:
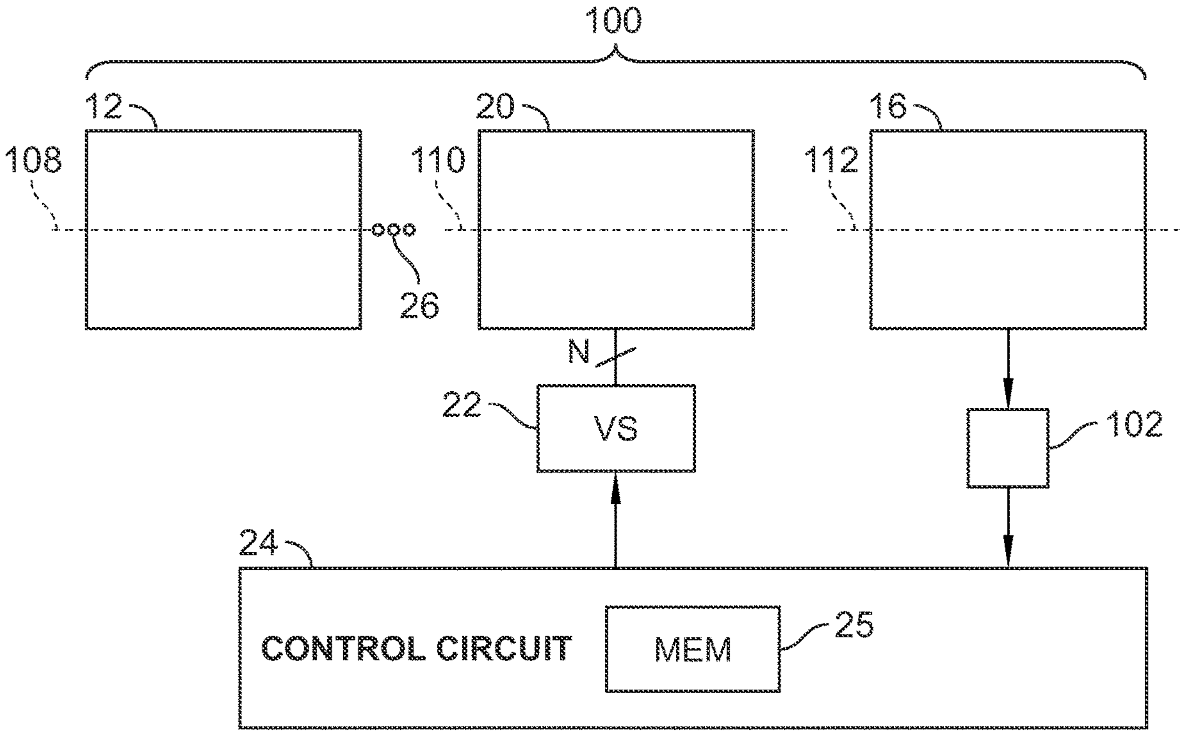
FIG. 4A is a simplified side-view diagram of another embodiment of a charged particle analysis system including the radially segmented charged particle guide illustrated by example in FIG. 2 for focusing charged particles exiting an upstream charged particle source to a selected position or area of a charged particle inlet of a downstream charged particle analysis stage, wherein the charged particle analysis stage includes a virtual charged particle position detector integrated therein for estimating a position of charged particles entering the charged particle inlet of the charged particle analysis stage relative to a central, longitudinal axis thereof.
Figure 4B:
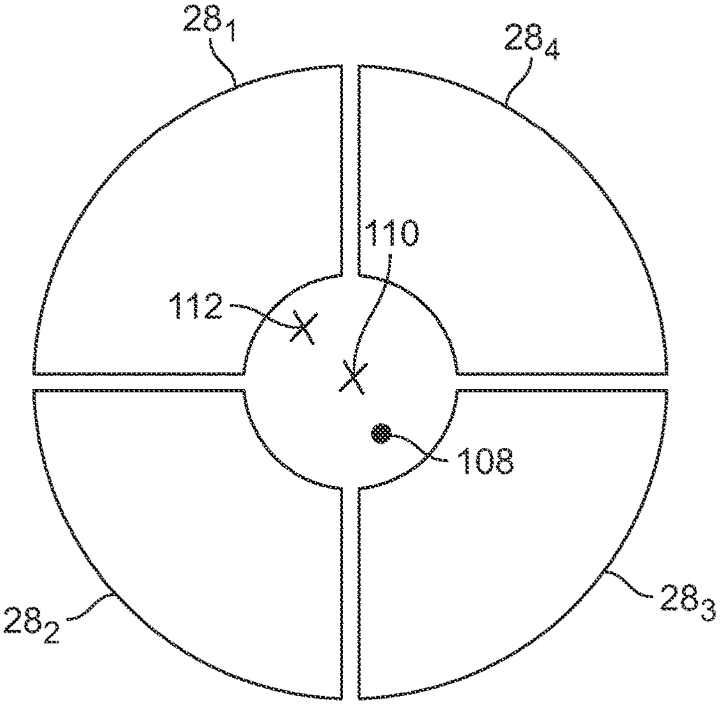
FIG. 4B is a simplified end view of the radially segmented charged particle guide of FIG. 3A, illustrating example focusing of a charged particle entering off-axis into the charged particle inlet from the charged particle source to another off-axis position of the charged particle outlet so as to enter the charged particle inlet of the charged particle analysis stage along a central, longitudinal axis thereof.

It bears pointing out that the voltages V1-V4 determined and selected to guide the charged particles 26 to and along a particular axis or travel path will hold true only so long as the charged particles 26 enter the radially segmented charged particle guide 20 along the same path for which the voltages V1-V4 were determined. If the charged particle source 12, sample and/or system 10, 10' changes or is/are otherwise operable such that the charged particles 26 enter the radially segmented charged particle guide 20 along a different path, new voltages V1-V4 must be determined to guide the charged particles 26 to and along the same exit path. In any case, although not specifically illustrated in FIG. 1A or FIG. 1B, many, but not all, practical systems in which the radially segmented charged particle guide 20 is implemented will require a "sensor" to provide feedback as to the point or position, relative to an axis or other position indicator, of charged particles exiting the radially segmented charged particle guide 20. In some embodiments, such a "sensor" may be implemented in the form of a physical sensor or sensing system coupled to the charged particle outlet or exit end of the radially segmented charged particle guide 20, coupled to the charged particle inlet end of the downstream charged particle analysis stage 16 or otherwise positioned between the charged particle outlet of the radially segmented charged particle guide 20 and the charged particle inlet of the charged particle analysis stage 16. One example system implementing an embodiment of such a physical sensing system is illustrated in FIGS. 3A-3C and will be described in detail below. Alternatively or additionally, the "sensor" may be implemented in the form of a virtual sensor embedded in one or more components of the downstream charged particle analysis stage 16. One example system illustrating an embodiment of such a virtual sensor is illustrated in FIGS. 4A-4B and will be described in detail below. Alternatively or additionally still, the "sensor" may be implemented in the form of virtual sensor embedded in a charged particle analysis instrument in which one or more of the radially segmented charged particle guides is/are also embedded. Example systems illustrating embodiments of such a virtual sensor are illustrated in FIGS. 5-14, and will be described in detail below. In any such implementation of the "sensor," the control circuit(s) 24 will illustratively be configured, e.g., in the form of corresponding instructions stored in the memory 25 and executable by the control circuit(s) 24, to control the operation of the voltage source 22 based on feedback provided by the "sensor" to produce the various DC output voltages with magnitudes selected to guide charged particles entering the radially segmented charged particle guide(s) 20 in an axial direction along one path to exit the radially segmented charged particle guide 20 in the axial direction along a different path.

Finally, an example system in which the path along which charged particles 26 enter the radially segmented charged particle guide 20 need not be known or be repeatable, and which need not require a "sensor" to provide feedback as to the point or position of charged particles exiting the radially segmented charged particle guide 20, is illustrated in FIG. 15 and will be described in detail below. In any such implementation of the radially segmented charged particle guide 20, the control circuit(s) 24 will illustratively be configured, e.g., in the form of instructions stored in the memory 25 and executable by the control circuit(s) 24, to control the operation of the voltage source 22 to sequentially, and in some embodiments repeatedly, produce different sets of DC output voltages with magnitudes selected to guide charged particles entering the radially segmented charged particle guide 20 in the axial direction along various different paths to exit the radially segmented charged particle guide 20 in the axial direction along different paths focused more toward the central, longitudinal axis defined through the radially segmented charged particle guide 20.

Referring now to FIGS. 3A-3C, an embodiment is shown of a charged particle analysis system 50 which includes the radially segmented charged particle guide 20 and an embodiment of a physical sensing system in the form of a charged particle position detector 54 configured to produce feedback signals usable by the control circuit(s) 24 to control the operation of the voltage source 22 to produce the various DC output voltages with magnitudes selected to guide charged particles 26 through the radially segmented charged particle guide 20 as described above. In the illustrated embodiment, the charged particle analysis system 50 includes the charged particle source 12 illustrated in FIGS. 1A and 1B and described above, and a charged particle analysis stage 52 with the radially segmented charged particle guide 20 positioned therebetween. In one embodiment, the charged particle analysis stage 52 may be a conventional target upon which it is desirable to collect charged particles exiting the charged particle source 12. In such embodiments, the radially segmented charged particle guide 20 and the charged particle position detector 54 may be used to guide or focus charged particles to or toward a particular spot or area 53 of the target 52, e.g., to or toward the point or area 53 through which the axis 60 defined centrally through the target 52 or some other point, area or location of the target 52 extends. In other embodiments, the charged particle analysis stage 52 may be or include any number of charged particle analyzers as described above, wherein the axis 60 represents a longitudinal axis extending centrally through a charged particle inlet, e.g., inlet orifice, of the charged particle analysis stage 52 and the area 53 corresponds to the charged particle inlet of the charged particle analysis stage 52.

In the embodiment illustrated in FIGS. 3A-3C, the axis 60 represents the central, longitudinal axis defined through each of the charged particle source 12, the radially segmented charged particle guide 20 and the charged particle analysis stage 52, although in alternate embodiments one or more of the charged particle source 12, the radially segmented charged particle guide 20 and the charged particle analysis stage 52 may be axially misaligned with one or more of the others. Also in the illustrated embodiment, charged particles 26 exit the charged particle source 12 off-axis, i.e., along a path that is not collinear with the central, longitudinal axis 60, although in alternate embodiments the charged particles 26 may axially exit the charged particle source 12 along any path.

As depicted by example in FIG. 3A, the charged particle position detector 54 may be positioned between the charged particle outlet of the radially segmented charged particle guide 20 and the charged particle inlet of the charged particle analysis stage 52, i.e., such that the detector 54 is physically attached to neither the guide 20 nor the stage 52. In some alternate embodiments, the charged particle position detector 54 may be mounted, attached, or otherwise secured to the radially segmented charged particle guide 20. In other alternate embodiments, the charged particle position detector 54 may be mounted, attached, or otherwise secured to the charged particle analysis stage 52.

Referring now to FIGS. 3A and 3B, the charged particle position detector 54 illustratively includes a plurality of radiation detectors, e.g., light detectors, radially disposed about the axis 60, such that the axis 60 extends centrally through the radial space defined between the radiation detectors. In the illustrated embodiment, four such radiation detectors $56_1$-$56_4$ are radially spaced equidistant from one another about the axis 60; although in alternate embodiments, more or fewer such radiation detectors may be included. Radiation sensing inputs of the detectors $56_1$-$56_4$ each face the axis 60, and signal outputs of the detectors $56_1$-$56_4$ are electrically connected to respective radiation signal detection inputs D1-D4 of the control circuit 24. A radiation source 58, e.g., a laser or other conventional radiation source, has a radiation output aimed at the axis 60, and a control input electrically connected to a radiation source control output L of the control circuit 24. In some embodiments, the radiation source 58 is configured to produce radiation in the visible spectrum, and the detectors $56_1$-$56_4$ are likewise configured to detect radiation in the visible spectrum, although in alternate embodiments the radiation source 58 and the detectors $56_1$-$56_4$ are configured to product and detect, respectively, radiation outside of the visible spectrum. In any case, the radiation source 58 is positioned to produce and focus radiation, e.g., in the form of a collimated beam, or to produce radiation which is subsequently focused by conventional optics and/or other conventional devices, along a narrow path 59 which intersects the portion of the axis 60 about which the radiation sensing inputs of the detectors $56_1$-$56_4$ are aimed. Charged particles which travel along, i.e., collinear with, the axis 60 will be irradiated at the point of intersection of the radiation path 59 and the axis 60 by the focused radiation produced by the radiation source 58, and charged particles which travel any other path non-collinear with the axis 60 will not be irradiated by the focused radiation produced by the radiation source 58. Irradiated charged particles will absorb and then emit radiation, and the emitted radiation will be detected by the detectors $56_1$-$56_4$ which will produce and supply radiation detection signals to the control circuit 24.

In order to direct charged particles 26 from the off-axis position illustrated by example in FIG. 3C to the axis 60, the control circuit 24 is illustratively configured to control the voltage source 22 to modify the voltages V1-V4, e.g., according to one or more conventional or other optimization routines, in a manner which guides the charged particles toward the axis 60. As charged particles 26 begin to become irradiated by the radiation source 58, the control circuit 24 will continued to modify the voltages V1-V4 until the radiation detection signals produced by the detectors $56_1$-$56_4$ reach maximum values, at which point the charged particles 26 will be traveling along a path that is collinear with the axis 60 such that charged particles. Thereafter, the magnitudes of the voltages V1-V4 may be maintained and the charged particle position detector 54 may be deactivated, and charged particles 26 passing through the radially segmented charged particle guide 20 will be focused toward and to the point, area or charged particle inlet 53 of the charged particle analysis stage 52.

Referring now to FIGS. 4A and 4B, another embodiment is shown of a charged particle analysis system 100 which includes the radially segmented charged particle guide 20 positioned between the charged particle source 12 and the charged particle analysis stage 16, wherein the charged particle source 12 and the charged particle analysis stage 16 are as described above, and wherein the charged particle analysis stage 16 further includes an embodiment of a virtual sensor embedded therein. In the illustrated embodiment, the charged particle analysis stage 16 is or includes a charged particle detector having at least one signal operatively coupled to at least one signal detection circuit 102, e.g., in the form of one or more amplifiers, charge sensitive preamplifiers or other charge signal detection devices, configured to produce charged particle detection signals at an output (or outputs) thereof and to supply such charged particle detection signals to the control circuit 24.

In the illustrated embodiment, the charged particle source 12 defines a longitudinal axis 108 centrally therethrough, the radially segmented charged particle guide 20 defines a longitudinal axis 110 centrally therethrough, and the charged particle analysis stage 16 defines a longitudinal axis 112 centrally therethrough. As illustrated by example in FIG. 4A, charged particles 26 exit the charged particle source 12 along the axis 108, i.e., such that the charged particles move toward the charged particle inlet of the radially segmented charged particle guide 20 along a path that is collinear with the central, longitudinal axis 108 of the charged particle source 12. As illustrated by example in FIG. 4B, none of the axes 108, 110, 112 are aligned with one another, i.e., no axis 108, 110, 112 is collinear with either of the others. In alternate embodiments, charged particles 26 may exit the charged particle source 12 off-axis, i.e., along a path that is not collinear with the axis 108, and/or one or more of the axes 108, 110, 112 may be collinear with either or both of the other axes.

In any case, the control circuit 24 is illustratively configured to process the charged particle detection signals, provided thereto by the signal detection circuit(s) 102, to determine spectral information, e.g., particle mass-to-charge ratio, particle charge, particle mass, etc., of charged particles detected by the charged particle analysis stage 16 in a conventional manner. As part of such detection of charged particles by the charged particle analysis stage 16, the control circuit 24 is illustratively operable to determine whether charged particles exiting the radially segmented charged particle guide 20 have entered the charged particle analysis stage 16 in a manner which produces valid charged particle measurement information; that is, the control circuit 24 is operable to determine whether charged particles captured by the charged particle analysis stage 16 produce complete or incomplete charge detection information. In embodiments of the charged particle analysis stage 16 which operate to trap charged particles therein, e.g., one or more ELIT's and/or one or more orbitraps, this measure of complete or incomplete charge detection is illustratively determined by the control circuit 24 in the form of a trapping event percentage. For any particular run of charged particle analysis, perfect charge detection corresponds to 100% trapping events, and null charge detection corresponds to 0% trapping events. In the embodiment illustrated in FIGS. 4A and 4B, the trapping event percentage serves as the virtual sensor, and the control circuit 24 is operable to monitor the trapping event percentage and control the voltage source 22 modify the voltages V1-V4, e.g., according to one or more conventional or other optimization routines, so as to maximize the trapping event percentage. In a practical sense, such modification of the voltages V1-V4 will cause the radially segmented charged particle guide 20 to cause charged particles entering the charged particle inlet of the guide 20 along the path 118 to exit the charged particle outlet of the guide 20 along the path 112, which is the central, longitudinal axis of the charged particle analysis stage 16. Those skilled in the art will recognize other characteristics of the charged particle analysis stage 16, which may be used in place of the trapping event percentage as the virtual sensor output feedback to the control circuit 24 to guide the appropriate selection of the magnitudes of the voltages V1-V4. An example may illustratively include, but is not limited to, trapping efficiency of the charged particle analysis stage 16.

Figure 5:
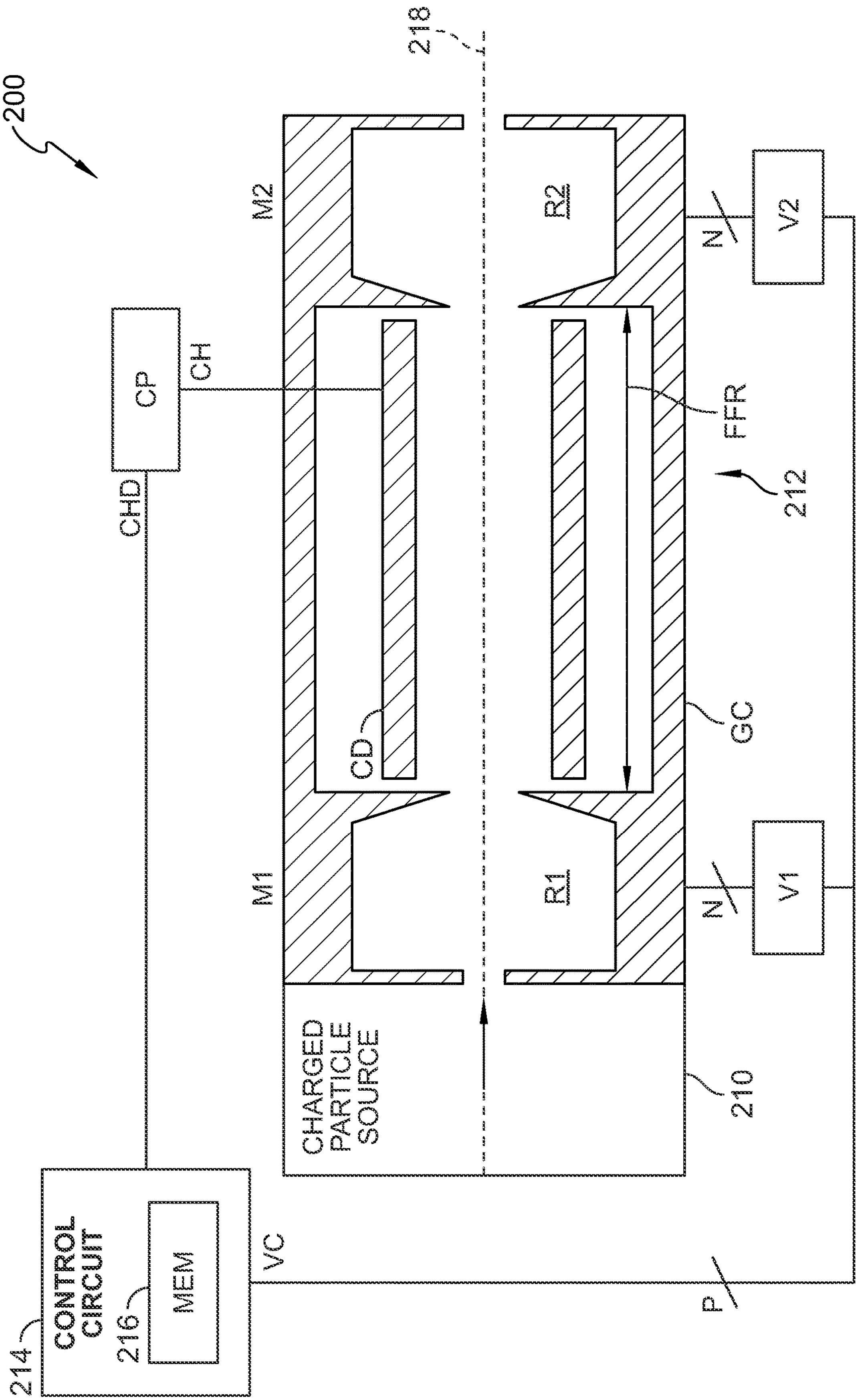
FIG. 5 is a simplified side-view diagram of a charged detection mass spectrometer (CDMS) including an embodiment of an electrostatic linear ion trap (ELIT) with control and measurement components coupled thereto.

Referring to FIG. 5, another embodiment of a charged particle analysis system 200 is shown in which at least one of the radially-segmented charged particle guides 20 illustrated by example in FIG. 2 may be implemented. In the illustrated embodiment, the charged particle analysis system 200 illustrated by example in FIG. 5 is a charge detection mass spectrometer (CDMS) 200 illustratively including a charged particle source 210 operatively coupled to an embodiment of an electrostatic linear ion trap (ELIT) 212, shown with control and measurement components coupled to the ELIT 212. The charged particle source 210 illustratively includes any conventional device or apparatus for generating charged particles from a sample and may further include one or more devices and/or instruments for separating, collecting, filtering, controlling/setting energy, fragmenting and/or normalizing or shifting charge states of charged particles according to one or more molecular characteristics. As one illustrative example, which should not be considered to be limiting in any way, the charged particle source 210 may include a conventional electrospray ionization source, a matrix-assisted laser desorption ionization (MALDI) source or the like, coupled to an inlet of a conventional mass spectrometer. The mass spectrometer may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, orbitrap, or the like. In any case, the charged particle outlet of the mass spectrometer is operatively coupled to a charged particle inlet of the ELIT 212 as depicted by example in FIG. 5. The sample from which the charged particles are generated may be or include any biological or other material.

In the illustrated embodiment, the ELIT 212 illustratively includes a charge detector CD surrounded by a ground chamber or cylinder GC and operatively coupled to opposing ion mirrors M1, M2 respectively positioned at opposite ends of the charged detector CD. The ion mirrors M1, M2 may alternatively be referred to herein as "endcaps" or "end caps," it being understood that the terms ion mirror and endcap (or end cap) are, for purposes of this disclosure, synonymous. The ion mirror M1 is operatively positioned between the charged particle outlet of the charged particle source 210 and one end of the charge detector CD, and the ion mirror M2 is operatively positioned at the opposite end of the charge detector CD. Each ion mirror M1, M2 defines a respective ion mirror region R1, R2 therein. The regions R1, R2 of the ion mirrors M1, M2, the charge detector CD, and the spaces between the charge detector CD and the ion mirrors M1, M2 are axially aligned such that together they define a longitudinal axis 218 centrally therethrough which illustratively represents an ideal ion travel path through the ELIT 210 and between the ion mirrors M1, M2 as will be described in greater detail below. The region defined axially between the opposed inner surfaces of the ion mirrors M1, M2, i.e., in which the charge detector CD is positioned, illustratively defines a field-free region FFR, i.e., in which no electric field is established during the operation of the ELIT 210, as described below.

In the illustrated embodiment, voltage sources V1, V2 are electrically coupled to the ion mirrors M1, M2 respectively. Each voltage source V1, V2 illustratively includes one or more switchable DC voltage sources which may be controlled or programmed to selectively produce a number, N, programmable or controllable voltages, wherein N may be any positive integer. Illustrative examples of such voltages will be described below with respect to FIGS. 6A and 6B to establish each of two different operating modes of each of the ion mirrors M1, M2 as will be described in detail below. In any case, the ELIT 210 is designed such that charged particles move within the ELIT 210 close to the longitudinal axis 218, which ideally extends centrally through the charge detector CD and the ion mirrors M1, M2, under the influence of electric fields selectively established in the ion mirrors M1, M2 by the voltage sources V1, V2.

Figure 6A:
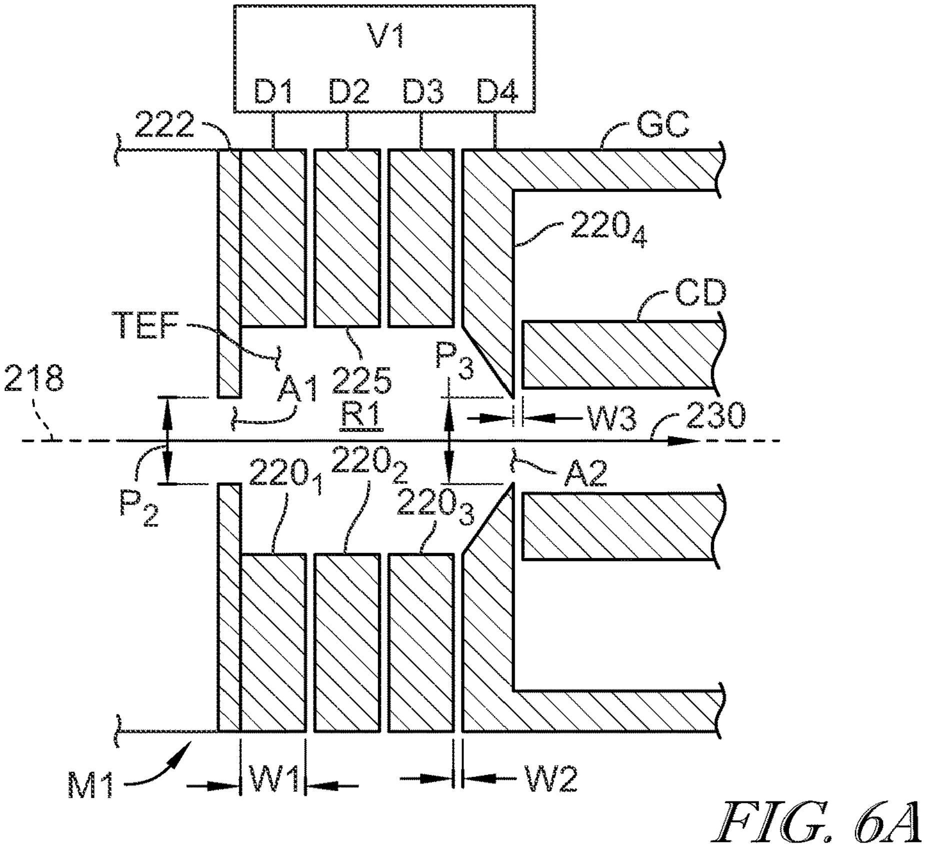
FIG. 6A is a magnified side view of the ion mirror M1 of the ELIT illustrated in FIG. 5 in which the mirror electrodes of M1 are controlled to produce an ion transmission electric field therein.
Figure 6B:
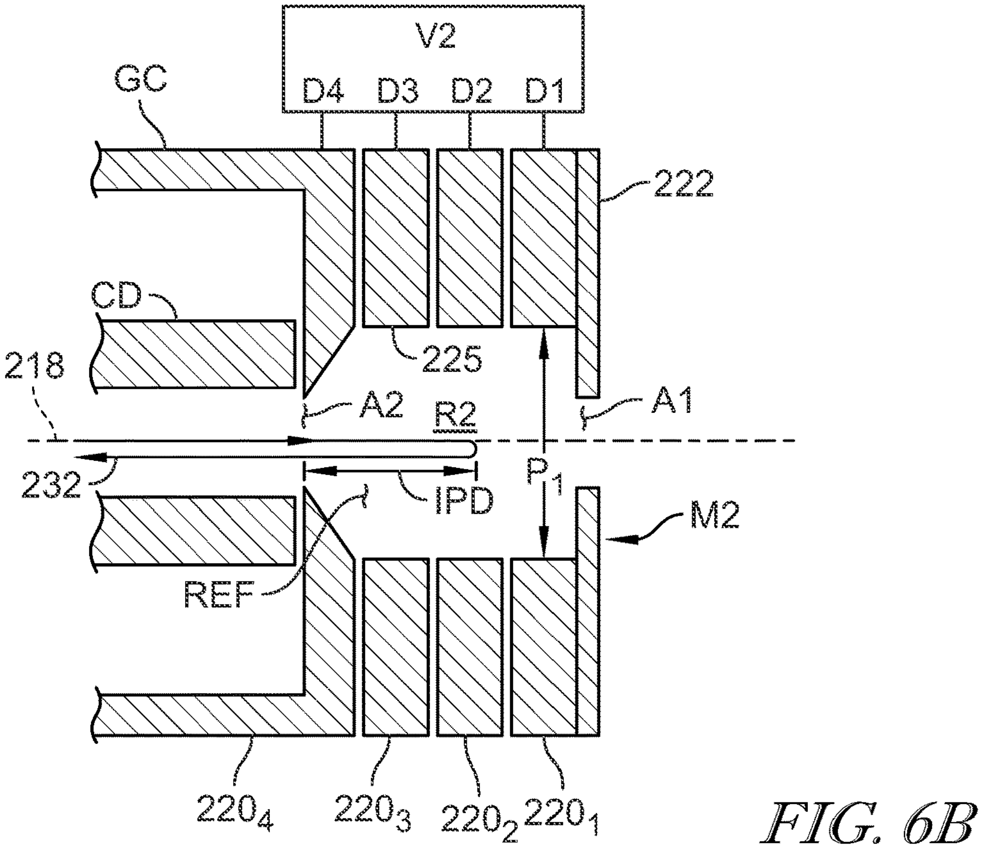
FIG. 6B is a magnified side view of the ion mirror M2 of the ELIT illustrated in FIG. 5 in which the mirror electrodes of M2 are controlled to produce an ion reflection electric field therein.

The voltage sources V1, V2 are illustratively shown electrically connected by a number, P, of signal paths to a conventional processor 214 including a memory 216 having instructions stored therein which, when executed by the processor 214, cause the processor 214 to control the voltage sources V1, V2 to produce desired DC output voltages for selectively establishing ion transmission and ion reflection electric fields, TEF, REF respectively, within the regions R1, R2 of the respective ion mirrors M1, M2 (see, e.g., FIGS. 6A and 6B). P may be any positive integer. In some alternate embodiments, either or both of the voltage sources V1, V2 may alternatively or additionally be programmable to selectively produce one or more constant output voltages. In other alternative embodiments, either or both of the voltage sources V1, V2 may be configured to produce one or more time-varying output voltages of any desired shape. It will be understood that more or fewer voltage sources may be electrically connected to the mirrors M1, M2 in alternate embodiments.

The charge detector CD is illustratively provided in the form of an electrically conductive cylinder, illustratively referred to herein as a charge detection cylinder, which is electrically connected to a signal input of a charge sensitive preamplifier CP, and the signal output of the charge-sensitive preamplifier CP is electrically coupled to the processor 214. The voltage sources V1, V2 are illustratively controlled in a manner, as described in detail below, which selectively traps in the ELIT 212 at least one charged particle entering the charged particle inlet of the ELIT 212 and causes the at least one charged particle to oscillate with the ELIT 212 back and forth between the ion mirrors M1, M2 each time passing axially through the charge detection cylinder CD. With at least one charged particle so trapped within the ELIT 212 and oscillating back and forth between the ion mirrors M1, M2, the charge sensitive preamplifier CP is illustratively operable in a conventional manner to detect charges (CH) respectively induced on the charge detection cylinder CD as the at least one charged particle repeatedly passes through the charge detection cylinder CD between the ion mirrors M1, M2, and to produce charge detection signals (CHD) corresponding thereto. The charge detection signals CHD are illustratively periodic and are recorded in the form of amplitude and period values and, in this regard, each amplitude and period pair represents ion measurement information for a single, respective charge detection event in which a charged particle is traveling through the charge detection cylinder CD. The amplitude is the amplitude of the charge induced by the charged particle on the charge detection cylinder as the charged particle passes therethrough, and the period value is the time duration of passage of the charged particle through the charge detection cylinder. A plurality of such amplitude and period values are measured and recorded during a respective charged particle measurement event (i.e., during a charged particle trapping event), and the resulting plurality of recorded values i.e., the collection of recorded charged particle measurement information, for the charged particle measurement event, is processed to determine charged particle mass-to-charge ratio, charge magnitude and, in some cases, mass values as will be described below. Multiple charged particle measurement events can be processed in this manner, and a mass-to-charge ratio and/or mass and/or charge spectrum of the sample may illustratively be constructed therefrom.

Referring now to FIGS. 6A and 6B, example embodiments are shown of the ion mirrors M1, M2 respectively of the ELIT 212 depicted in FIG. 1. Illustratively, the ion mirrors M1, M2 are identical to one another in that each includes a cascaded arrangement of 4 spaced-apart, electrically conductive mirror electrodes. For each of the ion mirrors M1, M2, a first mirror electrode $\mathbf{220}_1$ has a thickness W1 and defines a passageway, e.g., an end cap inner diameter, centrally therethrough of diameter P1. An end plate 222 is affixed or otherwise coupled to an outer surface of the first mirror electrode $\mathbf{220}_1$ and defines an aperture A1 centrally therethrough which serves as an ion entrance to and/or exit from the region R1, R2 of the respective ion mirror M1, M2. In the case of the ion mirror M1, the end plate 222 is coupled to, or is part of, the charged particle exit of the ion source 210 illustrated in FIG. 5. The aperture A1 for each end plate 222 illustratively has a diameter P2.

A second mirror electrode $\mathbf{220}_2$ of each ion mirror M1, M2 is spaced apart from the first mirror electrode $\mathbf{220}_1$ by a space having width W2. The second mirror electrode $\mathbf{220}_2$, like the mirror electrode $220_1$, has thickness W1 and defines a passageway centrally therethrough of diameter P1. A third mirror electrode $220_3$ of each ion mirror M1, M2 is likewise spaced apart from the second mirror electrode $220_2$ by a space of width W2. The third mirror electrode $220_3$ has thickness W1 and defines a passageway centrally therethrough of width P1. Illustratively, the passageways are circular in cross-section such that the respective region R1, R2 formed by the mirror electrodes $220_1$, $220_2$, $220_3$ is generally cylindrical, although in alternate embodiments one or more of the mirror electrodes $220_1$, $220_2$, $220_3$ may define a passageway therethrough of non-circular in cross section. Ideally, the longitudinal axis 218 of the ELIT 212 passes centrally through each mirror electrode $220_1$, $220_2$, $220_3$ such that the inwardly-facing, terminal surfaces 225 of the passageways defined through the mirror electrodes $220_1$, $220_2$, $220_3$ align with one another so as to form a uniform ion mirror region R1, R2 respectively.

A fourth mirror electrode $220_4$ is spaced apart from the third mirror electrode $220_3$ by a space of width W2. The fourth mirror electrode $220_4$ illustratively has a thickness of W1 and is formed by a respective end of the ground cylinder, GC disposed about the charge detector CD. The fourth mirror electrode $220_4$ defines an aperture A2 centrally therethrough which is illustratively conical in shape and increases linearly between the internal and external faces of the ground cylinder GC from a diameter P3 defined at the internal face of the ground cylinder GC to the diameter P1 at the external face of the ground cylinder GC (which is also the internal face of the respective ion mirror M1, M2). In some alternate embodiments, the fourth mirror electrode $220_4$ may be identical to the mirror electrodes $220_1$-$220_3$, such that the fourth mirror electrode $220_4$ defines the inner diameter P1 therethrough, and in such embodiments an end plate, e.g., similar to the end plate 222, may be affixed or otherwise coupled to an outer surface of the fourth mirror electrode $220_4$ (i.e., that facing the charge detector CD), wherein the end plate defines the aperture A2 centrally therethrough.

The spaces defined between the mirror electrodes $220_1$-$220_4$ may be voids in some embodiments, i.e., vacuum gaps, and in other embodiments such spaces may be filled with one or more electrically non-conductive, e.g., dielectric, materials. The mirror electrodes $220_1$-$220_4$ and the end plates 222 are ideally axially aligned with one another, i.e., collinear, such that a longitudinal axis 218 passes centrally through each aligned passageway of the mirror electrodes $220_1$-$220_4$ of each ion mirror M1, M2 and also centrally through the apertures A1, A2. In embodiments in which the spaces between the mirror electrodes $220_1$-$220_4$ include one or more electrically non-conductive materials, such materials will likewise define respective passageways therethrough which are axially aligned, i.e., collinear, with the passageways defined through the mirror electrodes $220_1$-$220_4$ and which illustratively have diameters of P2 or greater. Illustratively, P1>P3>P2, although in other embodiments other relative diameter arrangements are possible. In some embodiments, the thicknesses of the mirror electrodes $220_1$-$220_4$ are identical, e.g., all W1, although in alternate embodiments one or more of the mirror electrodes $220_1$-$220_4$ may have a thickness that differs from one or more of the remaining mirror electrodes $220_1$-$220_4$. In some embodiments, A1=A2, although in alternate embodiments A1 may be greater to or lesser than A2. Although the ion mirrors M1, M2 are each shown as having four mirror electrodes $220_1$-$220_4$, it will be understood that in alternate embodiments the ion mirrors M1, M2 may include more or fewer such mirror electrodes.

The ion mirror region R1 is defined between the apertures A1, A2 of the ion mirror M1, and the ion mirror region R2 is likewise defined between the apertures A1, A2 of the ion mirror M2. The ion mirror regions R1, R2 are ideally identical to one another in shape and in volume.

As described above, the charge detector CD is illustratively provided in the form of an elongated, electrically conductive cylinder positioned and spaced apart between corresponding ones of the ion mirrors M1, M2 by a space of width W3. In one embodiment, W1>W3>W2, and P1>P3>P2, although in alternate embodiments other relative width arrangements are possible. In any case, the longitudinal axis 218 illustratively extends centrally through the passageway defined through the charge detection cylinder CD, such that the longitudinal axis 218 ideally extends centrally through the combination of the ion mirrors M1, M2 and the charge detection cylinder CD. The axial length, ML, of each ion mirror M1 is thus ML=4W1+3W2, and the axial length, FFL, of the field free drift region FFR is thus FFL=2W3+CDL, where CDL is the axial length of the charge detection cylinder CD.

In operation, the ground cylinder GC is illustratively controlled to ground potential such that the fourth mirror electrode $220_4$ of each ion mirror M1, M2 is at ground potential at all times. In some alternate embodiments, the fourth mirror electrode $220_4$ of either or both of the ion mirrors M1, M2 may be set to any desired DC reference potential, or to a switchable DC or other time-varying voltage source.

In the embodiment illustrated in FIGS. 6A and 6B, the voltage sources V1, V2 are each configured to produce a respective one four DC voltages D1-D4, and to supply the voltages D1-D4 to a respective one of the mirror electrodes $220_1$-$220_4$ of the respective ion mirror M1, M2. In some embodiments in which one or more of the mirror electrodes $220_1$-$220_4$ is to be held at ground potential at all times, the one or more such mirror electrodes $220_1$-$220_4$ may alternatively be electrically connected to the ground reference of the respective voltage supply V1, V2 and the corresponding one or more voltage outputs D1-D4 may be omitted. Alternatively or additionally, in embodiments in which any two or more of the mirror electrodes $220_1$-$220_4$ are to be controlled to the same non-zero DC values, any such two or more mirror electrodes $220_1$-$220_4$ may be electrically connected to a single one of the voltage outputs D1-D4 and superfluous ones of the output voltages D1-D4 may be omitted.

Each ion mirror M1, M2 is illustratively controllable and switchable, by selective application of the voltages D1-D4, between an ion transmission mode (as illustrated by example in FIG. 6A) in which the voltages D1-D4 produced by the respective voltage source V1, V2 establishes an ion transmission electric field (TEF) in the respective region R1, R2 thereof, and an ion reflection mode (as illustrated by example in FIG. 6B) in which the voltages D1-D4 produced by the respect voltage source V1, V2 establishes an ion reflection electric field (REF) in the respective region R1, R2 thereof. The region FFR defined between the ion mirrors M1, M2, in which the charge detection cylinder CD resides, illustratively remains electric field-free at all times as described above. As illustrated by example in FIG. 6A, once a charged particle from the charged particle source 210 is transported into the region R1 of the ion mirror M1 through the inlet aperture A1 of the ion mirror M1, the charged particle is focused toward the longitudinal axis 218 of the ELIT 212 by an ion transmission electric field TEF established in the region R1 of the ion mirror M1 via selective control of the voltages D1-D4 of V1. As a result of the focusing effect of the transmission electric field TEF in the region R1 of the ion mirror M1, the charged particle exiting the region R1 of the ion mirror M1 through the aperture A2 of the ground chamber GC attains a narrow trajectory into and through the charge detector CD, i.e., so as to maintain a path of ion travel through the charge detector CD that is close to, or collinear with, the longitudinal axis 218. An identical ion transmission electric field TEF may, at times, be selectively established within the region R2 of the ion mirror M2 via like control of the voltages D1-D4 of the voltage source V2. In the ion transmission mode, a charged particle entering the region R2 from the charge detection cylinder CD via the aperture A2 of M2 is focused toward the longitudinal axis 218 by the ion transmission electric field TEF within the region R2 so that the charged particle exits the aperture A1 of the ion mirror M2.

As illustrated by example in FIG. 6B, an ion reflection electric field REF established in the region R2 of the ion mirror M2 via selective control of the voltages D1-D4 of V2 acts to decelerate and stop a charged particle entering the ion region R2 from the charge detection cylinder CD via the ion inlet aperture A2 of M2, and to then accelerate the stopped charged particle in the opposite direction back through the aperture A2 of M2 and into the end of the charge detection cylinder CD adjacent to M2 as depicted by the ion trajectory 232, and to focus the charged particle toward the central, longitudinal axis 218 within the region R2 of the ion mirror M2 so as to maintain a narrow trajectory of the charged particle back through the charge detector CD toward the ion mirror M1. The distance that the charged particle penetrates the ion mirror M2, relative to the surface of the mirror electrode $\mathbf{220_4}$ facing the charge detection cylinder CD, before reversing direction as illustrated in FIG. 6B, defines a charged particle penetration depth IPD.

An identical ion reflection electric field REF may, at times, e.g., during a trapping event, be selectively established within the region R1 of the ion mirror M1 via like control of the voltages D1-D4 of the voltage source V1. In the ion reflection mode, a charged particle entering the region R1 from the charge detection cylinder CD via the aperture A2 of M1 is decelerated and stopped by the ion reflection electric field REF established within the region R1, then accelerated in the opposite direction back through the aperture A2 of M1 and into the end of the charge detection cylinder CD adjacent to M1, and focused toward the central, longitudinal axis 20 within the region R1 of the ion mirror M1 so as to maintain a narrow trajectory of the charged particle back through the charge detector CD toward the ion mirror M1. A charged particle that traverses the length of the ELIT 14 and is reflected by the ion reflection electric field REF in the ion regions R1, R2 to continue traveling back and forth through the charge detection cylinder CD between the ion mirrors M1, M2 as just described is considered to be trapped within the ELIT 212.

Example sets of output voltages D1-D4 to be produced by the voltage sources V1, V2 respectively to control a respective ion mirrors M1, M2 to the ion transmission and reflection modes described above, are shown in TABLE I below. It will be understood that the following values of D1-D4 are provided only by way of example, and that other values of one or more of D1-D4 may alternatively be used.

TABLE I

| Ion Mirror Operating Mode | Output Voltages (volts DC) |
|---|---|
| Transmission | V1: D1 = 0, D2 = 95, D3 = 135, D4 = 0 |
| | V2: D1 = 0, D2 = 95, D3 = 135, D4 = 0 |
| Reflection | V1: D1 = 190, D2 = 125, D3 = 135, D4 = 0 |
| | V2: D1 = 190, D2 = 125, D3 = 135, D4 = 0 |

Figure 7:
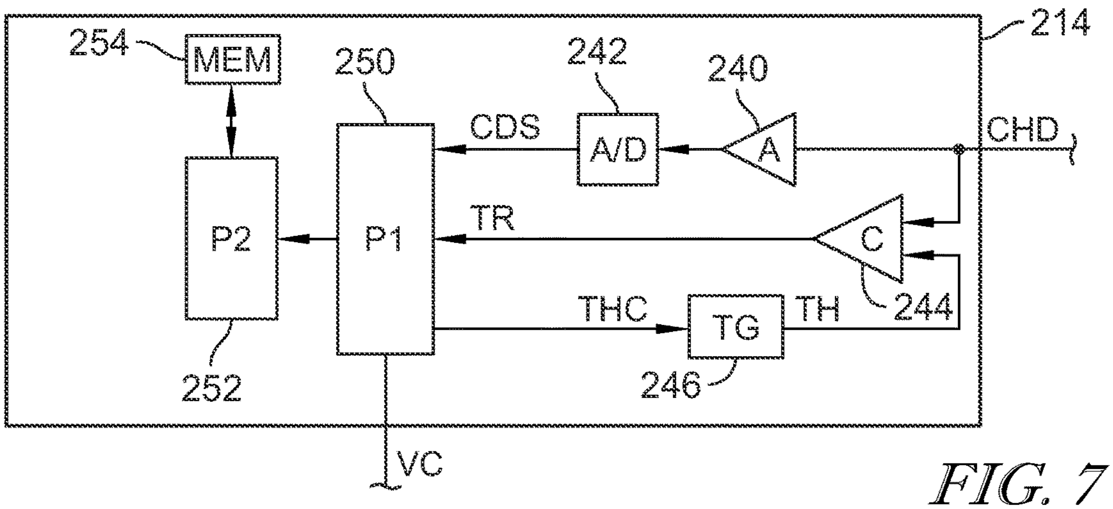
FIG. 7 is a simplified diagram of an embodiment of the processor illustrated in FIG. 1.

Referring now to FIG. 7, an embodiment is shown of the processor 214 illustrated in FIG. 5. In the illustrated embodiment, the processor 214 includes a conventional amplifier circuit 240 having an input receiving the charge detection signal CHD produced by the charge sensitive preamplifier CP and an output electrically connected to an input of a conventional Analog-to-Digital (A/D) converter 242. An output of the A/D converter 242 is electrically connected to a processor 250 (P1). The amplifier 240 is operable in a conventional manner to amplify the charge detection signal CHD produced by the charge sensitive preamplifier CP, and the A/D converter 242 is, in turn, operable in a conventional manner to convert the amplified charge detection signal to a digital charge detection signal CDS.

The processor 214 illustrated in FIG. 5 further includes a conventional comparator 244 having a first input receiving the charge detection signal CHD produced by the charge sensitive preamplifier CP, a second input receiving a threshold voltage CTH produced by a threshold voltage generator (TG) 246 and an output electrically connected to the processor 250. The comparator 244 is operable in a conventional manner to produce a trigger signal TR at the output thereof, which is dependent upon the magnitude of the charge detection signal CDH relative to the magnitude of the threshold voltage CTH. In one embodiment, for example, the comparator 244 is operable to produce an "inactive" trigger signal TR at or near a reference voltage, e.g., ground potential, as long as CHD is less than CTH, and is operable to produce an "active" TR signal at or near a supply voltage of the circuitry 240, 242, 244, 246, 250 or otherwise distinguishable from the inactive TR signal when CHD is at or exceeds CTH. In alternate embodiments, the comparator 244 may be operable to produce an "inactive" trigger signal TR at or near the supply voltage as long as CHD is less than CTH, and is operable to produce an "active" trigger signal TR at or near the reference potential when CHD is at or exceeds CTH. Those skilled in the art will recognize other differing trigger signal magnitudes and/or differing trigger signal polarities that may be used to establish the "inactive" and "active" states of the trigger signal TR so long as such differing trigger signal magnitudes and/or different trigger signal polarities are distinguishable by the processor 250, and it will be understood that any such other different trigger signal magnitudes and/or differing trigger signal polarities are intended to fall within the scope of this disclosure. In any case, the comparator 244 may additionally be designed in a conventional manner to include a desired amount of hysteresis to prevent rapid switching of the output between the reference and supply voltages.

The processor 250 is illustratively operable to produce a threshold voltage control signal THC and to supply THC to the threshold generator 246 to control operation thereof. In some embodiments, the processor 250 is programmed or programmable to control production of the threshold voltage control signal THC in a manner that controls the threshold voltage generator 246 to produce CTH with a desired magnitude and/or polarity. In other embodiments, a user may provide the processor 250 with instructions in real time, e.g., through a downstream processor, e.g., via a virtual control and visualization unit, to control production of the threshold voltage control signal THC in a manner which controls the threshold voltage generator 246 to produce CTH with a desired magnitude and/or polarity. In either case, the threshold voltage generator 246 is illustratively implemented, in some embodiments, in the form of a conventional controllable DC voltage source configured to be responsive to a digital form of the threshold control signal THC, e.g., in the form of a single serial digital signal or multiple parallel digital signals, to produce an analog threshold voltage CTH having a polarity and a magnitude defined by the digital threshold control signal THC. In some alternate embodiments, the threshold voltage generator 246 may be provided in the form of a conventional digital-to-analog (D/A) converter responsive to a serial or parallel digital threshold voltage TCH to produce an analog threshold voltage CTH having a magnitude, and in some embodiments a polarity, defined by the digital threshold control signals THC. In some such embodiments, the D/A converter may form part of the processor 250. Those skilled in the art will recognize other conventional circuits and techniques for selectively producing the threshold voltage CTH of desired magnitude and/or polarity in response to one or more digital and/or analog forms of the control signal THC, and it will be understood that any such other conventional circuits and/or techniques are intended to fall within the scope of this disclosure.

In addition to the foregoing functions performed by the processor 250, the processor 250 is further operable to control the voltage sources V1, V2 as described above with respect to FIGS. 6A, 6B to selectively establish ion transmission and reflection fields within the regions R1, R2 of the ion mirrors M1, M2 respectively. In some embodiments, the processor 250 is programmed or programmable to control the voltage sources V1, V2. In other embodiments, the voltage source(s) V1 and/or V2 may be programmed or otherwise controlled in real time by a user, e.g., through a downstream processor 252, e.g., via a virtual control and visualization unit. In either case, the processor 250 is, in one embodiment, illustratively provided in the form of a field programmable gate array (FPGA) programmed or otherwise instructed by a user to collect and store charge detection signals CDS for charge detection events and for ion measurement events, to produce the threshold control signal(s) TCH from which the magnitude and/or polarity of the threshold voltage CTH is determined or derived, and to control the voltage sources V1, V2. In this embodiment, the memory 216 described with respect to FIG. 5 is integrated into, and forms part of, the programming of the FPGA. In alternate embodiments, the processor 250 may be provided in the form of one or more conventional microprocessors or controllers and one or more accompanying memory units having instructions stored therein which, when executed by the one or more microprocessors or controllers, cause the one or more microprocessors or controllers to operate as just described. In other alternate embodiments, the processing circuit 250 may be implemented purely in the form of one or more conventional hardware circuits designed to operate as described above, or as a combination of one or more such hardware circuits and at least one microprocessor or controller operable to execute instructions stored in memory to operate as described above.

The embodiment of the processor 214 depicted in FIG. 7 further illustratively includes a second processor 252 coupled to the first processor 250 and also to at least one memory unit 254. In some embodiments, the processor 252 may include one or more peripheral devices, such as a display monitor, one or more input and/or output devices or the like; although in other embodiments, the processor 252 may not include any such peripheral devices. In any case, the processor 252 is illustratively configured, i.e., programmed, to execute at least one process for analyzing ion measurement events. Data in the form of charge magnitude and charge timing data (i.e., detection of the timing of charges induced by the ion on the charge detection cylinder relative to one another) received by the processor 250 via the charge detection signals CDS is illustratively transferred from the processor 250 directly to the processor 252 for processing and analysis upon completion of each ion measurement event.

In some embodiments, the processor 252 is illustratively provided in the form of a high-speed server operable to perform both collection/storage and analysis of such data. In such embodiments, one or more high-speed memory units 254 may be coupled to the processor 252, and is/are operable to store data received and analyzed by the processor 252. In one embodiment, the one or more memory units 254 illustratively include at least one local memory unit for storing data being used or to be used by the processor 252, and at least one permanent storage memory unit for storing data long term. In one such embodiment, the processor 252 is illustratively provided in the form of a Linux® server (e.g., OpenSuse Leap 42.1) with four Intel® Xeon™ processors (e.g., E5-465L v2, 12 core, 2.4 GHz). In this embodiment, an improvement in the average analysis time of a single ion measurement event file of over 100× is realized as compared with a conventional Windows® PC (e.g., i5-2500K, 4 cores, 3.3 GHz). Likewise, the processor 252 of this embodiment together with high speed/high performance memory unit(s) 254 illustratively provide for an improvement of over 100× in data storage speed. Those skilled in the art will recognize one or more other high-speed data processing and analysis systems that may be implemented as the processor 252, and it will be understood that any such one or more other high-speed data processing and analysis systems are intended to fall within the scope of this disclosure. In alternate embodiments, the processor 252 may be provided in the form of one or more conventional microprocessors or controllers and one or more accompanying memory units having instructions stored therein which, when executed by the one or more microprocessors or controllers, cause the one or more microprocessors or controllers to operate as described herein.

In the illustrated embodiment, the memory unit 254 illustratively has instructions stored therein which are executable by the processor 252 to analyze ion measurement event data produced by the ELIT 212 to determine ion mass spectral information for a sample under analysis. In one embodiment, the processor 252 is operable to receive ion measurement event data from the processor 250 in the form of charge magnitude and charge detection timing information measured during each of multiple "charge detection events" (as this term is defined above) making up the "ion measurement event" (as this term is defined above), and to process such charge detection events making up such an ion measurement event to determine ion charge and mass-to-charge data, and to then determine ion mass data therefrom. Multiple ion measurement events may be processed in like manner to create mass spectral information for the sample under analysis.

Figure 8A:
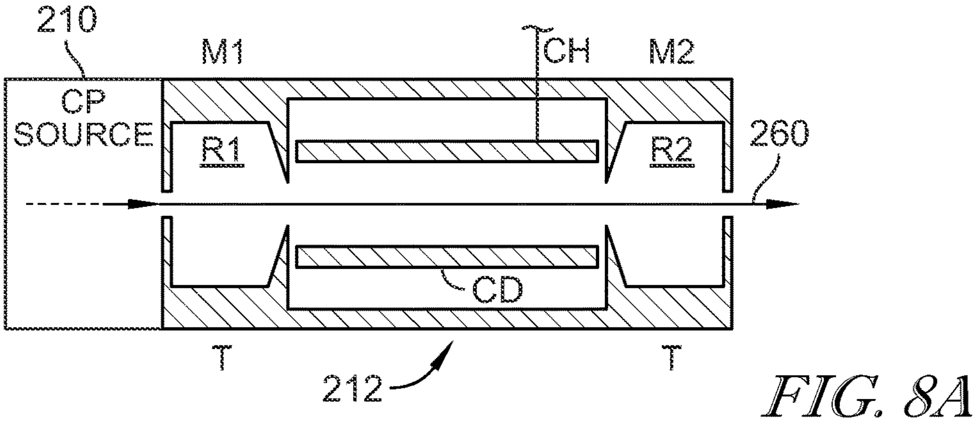
FIGS. 8A-8C are simplified side-view diagrams of the ELIT of FIG. 5 demonstrating sequential control and operation of the ion mirrors and of the charge generator to capture at least one ion within the ELIT and to cause the ion(s) to oscillate back and forth between the ion mirrors and through the charge detection cylinder to measure and record multiple charge detection events.
Figure 8B:
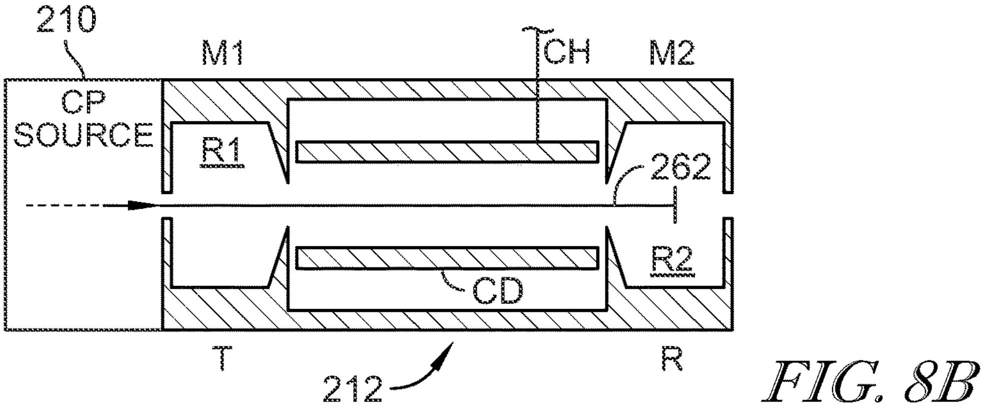
Figure 8C:
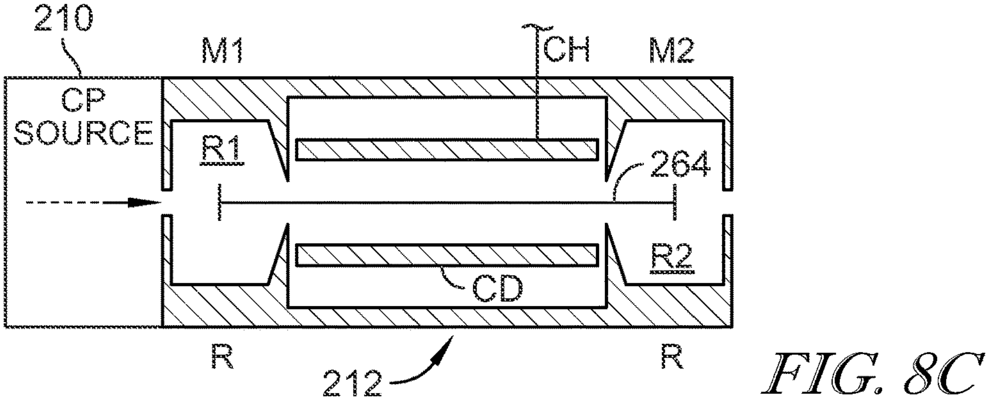

As briefly described above with respect to FIGS. 6A and 6B, the voltage sources V1, V2 are illustratively controlled by the processor 250, e.g., via the processor 252, in a manner which selectively establishes ion transmission and ion reflection electric fields in the region R1 of the ion mirror M1 and in the region R2 of the ion mirror M2 to guide ions introduced into the ELIT 212 from the charged particle source 210 through the ELIT 212, and to then cause at least one charged particle to be selectively trapped and confined within the ELIT 212 such that the trapped charged particle(s) repeatedly pass(es) through the charge detector CD as it/they oscillate(s) back and forth between M1 and M2. Referring to FIGS. 8A-8C, simplified diagrams of the ELIT 212 of FIG. 5 are shown depicting an example of such sequential control and operation of the ion mirrors M1, M2 of the ELIT 212. In the following example, the processor 252 will be described as controlling the operation of the voltage sources V1, V2 in accordance with its programming, although it will be understood that the operation of the voltage source V1 and/or the operation of the voltage source V2 may be virtually controlled, at least in part, by the processor 250.

As illustrated in FIG. 8A, the ELIT control sequence begins with the processor 252 controlling the voltage source V1 to control the ion mirror M1 to the ion transmission mode of operation (T) by establishing an ion transmission field within the region R1 of the ion mirror M1, and also controlling the voltage source V2 to control the ion mirror M2 to the ion transmission mode of operation (T) by likewise establishing an ion transmission field within the region R2 of the ion mirror M2. As a result, charged particles generated by the charged particle source 210 pass into the ion mirror M1 and are focused by the ion transmission field established in the region R1 toward the central, longitudinal axis 218 (see FIG. 5) as they pass into the charge detection cylinder CD. The charged particles then pass through the charge detection cylinder CD and into the ion mirror M2 where the ion transmission field established within the region R2 of M2 focusses the charged particles toward the longitudinal axis 218 such that the charged particles pass through the exit aperture A1 of M2 as illustrated by the ion trajectory 260 depicted in FIG. 8A.

Referring now to FIG. 8B, after both of the ion mirrors M1, M2 have been operating in ion transmission operating mode for a selected time period and/or until successful ion transmission therethrough has been achieved (e.g., by monitoring the charge detection signal CDS to determine the presence of charged particles passing through the charge detection cylinder CD), the processor 252 is illustratively operable to control the voltage source V2 to control the ion mirror M2 to the ion reflection mode (R) of operation by establishing an ion reflection field within the region R2 of the ion mirror M2, while maintaining the ion mirror M1 in the ion transmission mode (T) of operation as shown. As a result, at least one charged particle generated by the charged particle source 210 enters into the ion mirror M1 and is focused by the ion transmission field T established in the region R1 toward the central, longitudinal axis 218 such that the at least one charged particle passes through the ion mirror M1 and into the charge detection cylinder CD as just described with respect to FIG. 8A. The charged particle(s) then pass(es) through the charge detection cylinder CD and into the ion mirror M2 where the ion reflection field R established within the region R2 of M2 reflects the charged particle(s) to cause it/them to reverse travel so as to travel in the opposite direction and back into the charge detection cylinder CD, as illustrated by the ion trajectory 262 in FIG. 8B.

Referring now to FIG. 8C, after the ion reflection electric field has been established in the region R2 of the ion mirror M2, the processor 252 is operable to control the voltage source V1 to control the ion mirror M1 to the ion reflection mode (R) of operation by establishing an ion reflection field within the region R1 of the ion mirror M1, while maintaining the ion mirror M2 in the ion reflection mode (R) of operation in order to trap the charged particle(s) within the ELIT 212 such that the charged particle(s) oscillate(s) back and forth between the ion mirrors M1, M2 each time passing through the charge detection cylinder CD. As illustrated by example in FIG. 6B, the ion penetrates into the ion mirror M2 by the distance IPD (Ion Penetration Depth) before reversing direction, and as the ion mirrors M1, M2 are controlled identically in the reflection mode the ion likewise penetrates into the ion mirror M1 by the distance IPD before reversing direction.

In some embodiments, the processor 252 is illustratively operable, i.e., programmed, to control the ELIT 212 in a "random trapping mode" or "continuous trapping mode" in which the processor 252 is operable to control the ion mirror M1 to the reflection mode (R) of operation after the ELIT 212 has been operating in the state illustrated in FIG. 8B, i.e., with M1 in ion transmission mode and M2 in ion reflection mode, for a selected time period. Until the selected time period has elapsed, the ELIT 212 is controlled to operate in the state illustrated in FIG. 8B. In other embodiments, the processor 252 is operable, i.e., programmed, to control the ELIT 212 in a "trigger trapping mode" which illustratively carries a substantially greater probability of trapping one or more charged particles therein as compared to the random trapping mode. In the "trigger trapping mode," the processor 252 is operable to control the ion mirror M1 to the reflection mode (R) of operation after the at least one charged particle has been detected as passing through the charge detection cylinder CD.

In any case, with both of the ion mirrors M1, M2 controlled to the ion reflection operating mode (R) to trap an ion within the ELIT 212, the at least one charged particle is caused by the opposing ion reflection fields established in the regions R1 and R2 of the ion mirrors M1 and M2 respectively to oscillate back and forth between the ion mirrors M1 and M2, each time passing through the charge detection cylinder CD as illustrated by the ion trajectory 264 depicted in FIG. 8C and as described above. In one embodiment, the processor 250 is operable to maintain the operating state illustrated in FIG. 8C until the at least one charged particle passes through the charge detection cylinder CD a selected number of times. In an alternate embodiment, the processor 250 is operable to maintain the operating state illustrated in FIG. 8C for a selected time period after controlling M1 (and M2 in some embodiments) to the ion reflection mode (R) of operation. In either embodiment, the number of cycles or time spent in the state illustrated in FIG. 8C may illustratively be programmed, e.g., via instructions stored in the memory 254, or controlled via a user interface, and in any case the ion detection event information resulting from each pass by the ion through the charge detection cylinder CD is temporarily stored in the processor 250, e.g., in the form of an ion measurement file which may illustratively have a predefined data or sample length. When the charged particle(s) has/have passed through the charge detection cylinder CD a selected number of times or has/have oscillated back-and-forth between the ion mirrors M1, M2 for a selected period of time, the total number of charged particle detection events stored in the processor 250 defines a charged particle measurement event for each of the charged particle(s) and, upon completion of the charged particle measurement event, the stored charged particle detection events defining the charged particle measurement event, e.g., the charged particle measurement event file, is passed to, or retrieved by, the processor 252. The sequence illustrated in FIGS. 8A-8C then returns to that illustrated in FIG. 8A where the voltage sources V1, V2 are controlled as described above to control the ion mirrors M1, M2 respectively to the ion transmission mode (T) of operation by establishing ion transmission fields within the regions R1, R2 of the ion mirrors M1, M2 respectively. The illustrated sequence then repeats for as many times as desired.

In some embodiments, the charged particle measurement event files are analyzed in the frequency domain using a Fast Fourier Transform (FFT) algorithm. In such implementations, the mass-to-charge ratio (m/z) of a charged particle moving through the ELIT 212 is determined from the oscillation frequency (f0) of the charged particle measurement event data using a calibration constant (C) (Equation 1), the charge of the charged particle is determined by the magnitude of the fundamental frequency peak in the FFT and the mass of the charged particle is then determined as a product of m/z and the ion charge.

$$\frac{m}{z} = \frac{C}{f_0^2} \qquad \text{Equation 1}$$

In alternate embodiments, the signal measurements contained in the charged particle measurement event files may be analyzed in the time domain, in conjunction with the FFT, in a manner that incorporates information contained within higher order harmonics by fitting the signal measurements to a simulated waveform to more precisely measure the ion charge. Details relating to one example process for carrying out such a time-domain analysis can be found in co-pending International Application No. PCT/US2021/016435, filed Feb. 3, 2021 and published as WO 2021/158676 A1, the disclosure of which is expressly incorporated herein by reference in its entirety.

A previous ELIT design, an example of which is disclosed in co-pending U.S. Patent Application Pub. No. US 2020/0357626, the disclosure of which is expressly incorporated herein by reference in its entirety, was configured to optimize the accuracy of the charge measurement and at the same time reduce the contribution to the m/z resolution from the ion energy distribution. A method was also developed for optimizing geometric and electrostatic parameters of a cylindrical ELIT 212 to make the oscillation frequency of the trapped charged particle, and thus the measured m/z, highly resistant to change with variations in the energy and the trajectory of trapped charged particles while also preserving features of the design that give rise to a high charge resolution, as disclosed in co-pending International Application No. PCT/US2022/073503, filed Jul. 7, 2022, the disclosure of which is expressly incorporated herein by reference in its entirety.

Figure 9:
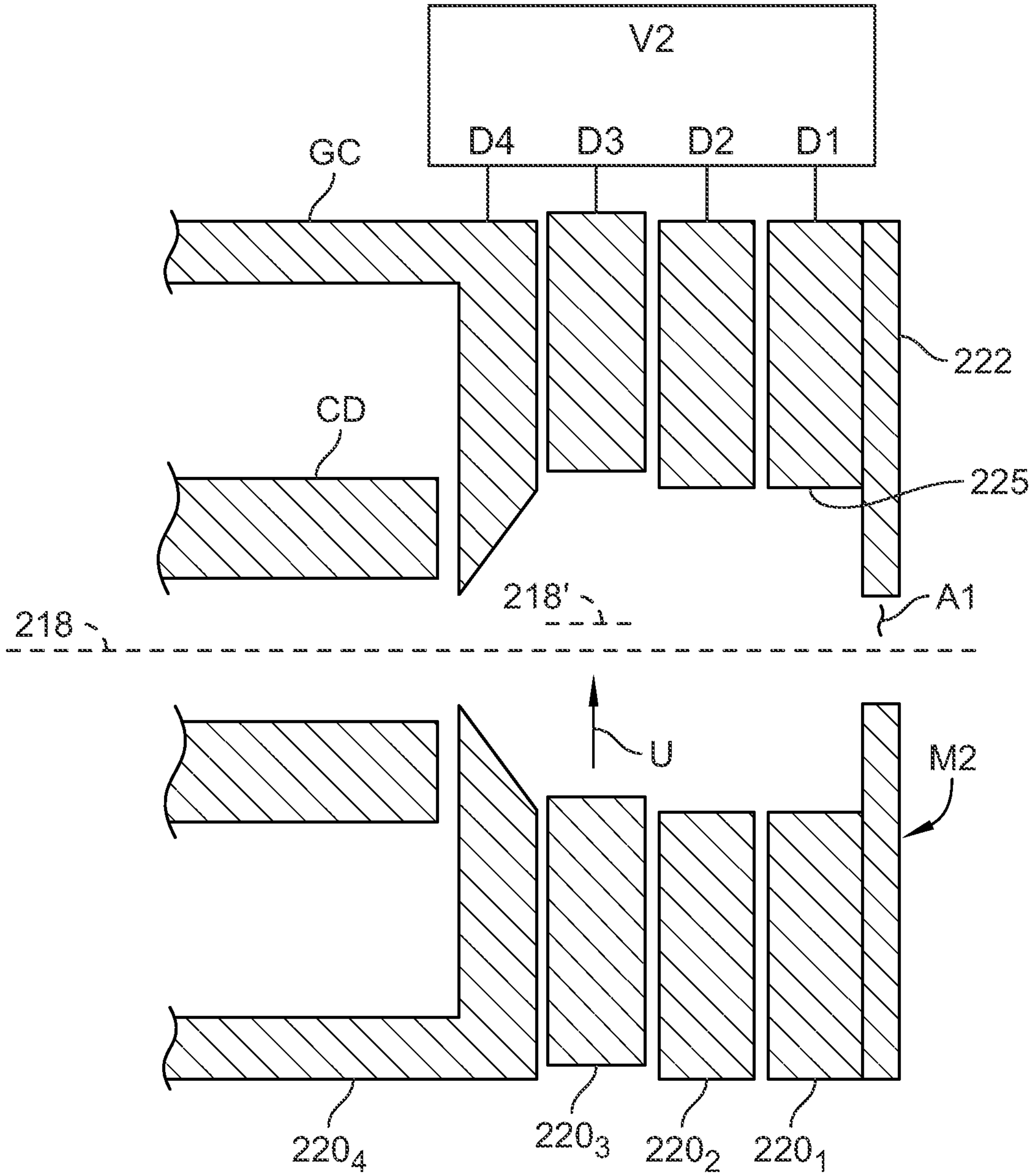
FIG. 9 is a simplified side-view diagram, similar to FIG. 6B, illustrating another example of the ion mirror M2 of the ELIT of FIG. 5 in which the position of the inner-most mirror electrode is offset relative to the remaining mirror electrodes.

As described above, the ELIT 212 is illustratively designed such that charged particles move within the ELIT 212 close to the longitudinal axis 218, which ideally extends centrally through the charge detector CD and the ion mirrors M1, M2, under the influence of electric fields selectively established in the ion mirrors M1, M2 by the voltage sources V1, V2. However, in physical implementations of an ELIT in which the ion mirrors M1, M2 are constructed of multiple ion mirror electrodes, such as illustrated by example in FIGS. 6A and 6B, one or more of the ion mirror electrodes may not perfectly align with others of the ion mirror electrodes. Referring to FIG. 9, for example, an implementation of the ion mirror M2 of FIG. 6B is shown in which the inner-most ion mirror electrode $\mathbf{220_3}$ is displaced upwardly relative to the remaining ion mirror electrodes $\mathbf{220_1}$, $\mathbf{220_2}$ and relative to the charge detection cylinder CD. As a result, the central, longitudinal axis 218' defined through the ion mirror electrode $\mathbf{220_3}$ is radially offset from the central, longitudinal axis 218 of the ELIT 212. Application of the voltage D3 to the ion mirror electrode $\mathbf{220_3}$ in the ion reflection operating mode R, as described above, will thus focus a charged particle traveling through the ion mirror M2 toward and along the central, longitudinal axis 218' which is offset from the central longitudinal axis 218 defined through the remaining ion mirror electrodes $\mathbf{220_1}$, $\mathbf{220_2}$ and through the charge detection cylinder CD. As a charged particle travels through the ion mirror electrode $\mathbf{220_3}$ toward the charge detection cylinder CD, focusing the charged particle from the central, longitudinal axis 218 defined through the ion mirror electrode $\mathbf{220_2}$ to and along the central, longitudinal axis 218' of the ion mirror electrode $\mathbf{220_3}$ may, in some cases, force the charged particle into contact with the ion mirror electrode $\mathbf{220_4}$ or into contact with the charge detection cylinder CD thereby resulting in the loss of the charged particle and a corresponding loss in charged particle measurement data.

Such physical misalignment(s) between one or more of the ion mirror electrodes $\mathbf{220_1}$, $\mathbf{220_2}$, $\mathbf{220_3}$, resulting in potential loss of charged particle data as just described, may thus adversely affect the trapping efficiency of the ELIT 212, wherein "trapping efficiency" is defined for purposes of this disclosure as the percentage of "full" trapping events over a set number of trapping events. A "full" trapping event is illustratively defined as one in which a charged particle is trapped within the ELIT 212 for at least a set amount of the total trapping time of the trapping event, e.g., for at least 90% of the total trapping time of the trapping event.

Figure 10:
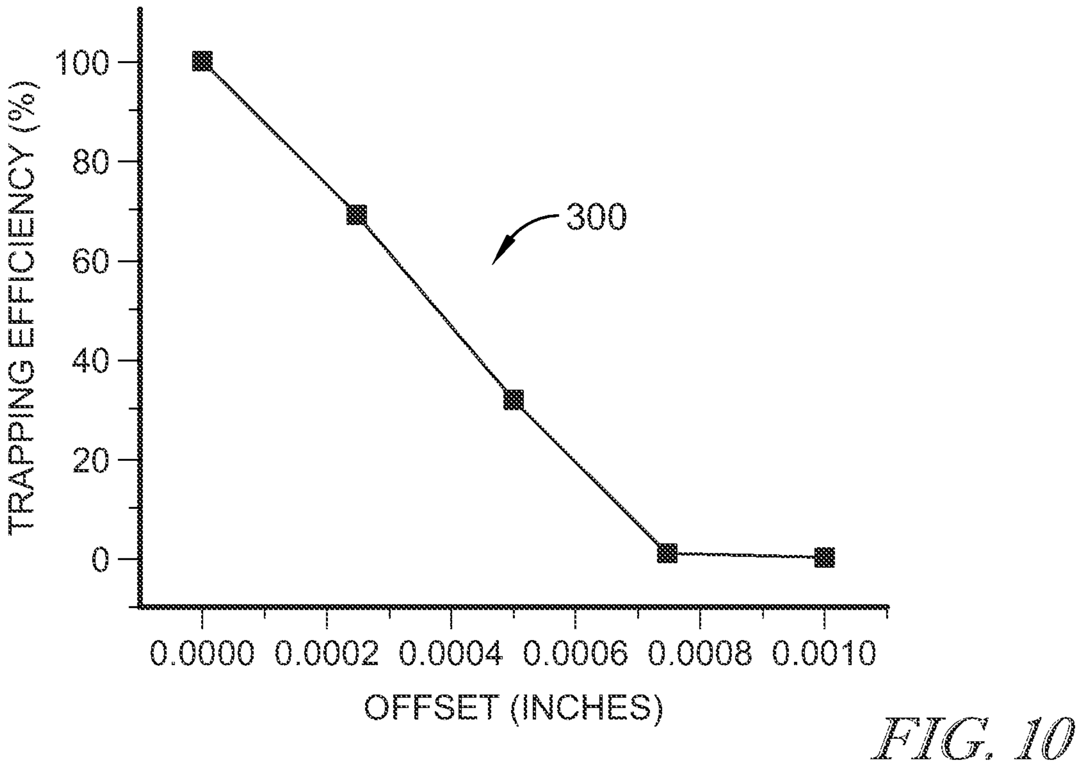
FIG. 10 is a plot of trapping efficiency of the ELIT of FIG. 5 vs offset distance of the inner-most mirror electrode relative to the remaining mirror electrodes as illustrated by example in FIG. 9.

The trapping efficiency of the ELIT 212 is determined by the processor 214 by monitoring the charge detection event data for each of a set number of successive trapping events, and computing the trapping efficiency as a ratio of full trapping events, i.e., in which the charge detection event data is consistent with a full trapping event, and non-full trapping events, i.e., in which the charge detection event data is not consistent with a full trapping event. Referring to FIG. 10, for example, a plot 300 is shown of the trapping efficiency of the ELIT 212 as a function of the offset of the central, longitudinal axis 218' of the ion mirror electrode $\mathbf{220_3}$ relative to the central, longitudinal axis 218 of the ELIT 212. In the illustrated example, an offset of a half-thousandth of an inch results in reduction of trapping efficiency from near 100%, in the case of perfect alignment of the axes 218, 218', to approximately 30%.

By implementing the offset ion mirror electrode $\mathbf{220_3}$ of FIG. 9 in the form of a radially segmented electrode ring, e.g., as illustrated by example in FIG. 2 and described hereinabove, the resulting radially segmented ion mirror electrode can be controlled via application of corresponding DC voltages to the respective radial segments to create a modified electric field within the opening 225 defined by the radially segmented ion mirror electrode $\mathbf{220_3}$ configured to move the travel path of charged particles therethrough toward, and ideally collinear with, the central, longitudinal axis 218 defined through the ELIT 212. By applying a potential shift to each electrode segment, trapping efficiency can be restored while retaining the resolving power of the ELIT 212. In this embodiment, the trapping efficiency thus serves as the virtual sensor to provide feedback to the control circuit 214 to guide the control circuit 214 to appropriate selection of the magnitudes of the corresponding DC voltages to apply to the respective radial segments.

Figure 11:
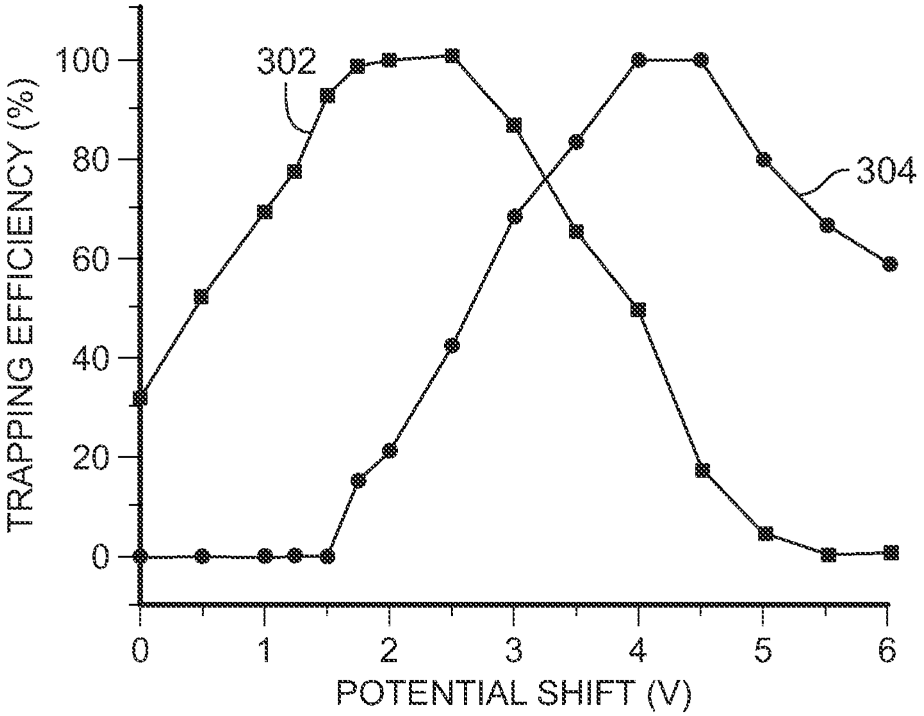
FIG. 11 is a plot of trapping efficiency of the ELIT of FIG. 5 vs potential shift applied to the offset inner-most mirror electrode of FIG. 9 for two different offset distances, wherein the radially segmented charged particle guide illustrated by example in FIG. 2 is implemented as the inner-most mirror electrode such that the radially segmented charged particle guide and virtual charged particle position detector are together integrated into the ELIT.
Figure 12:
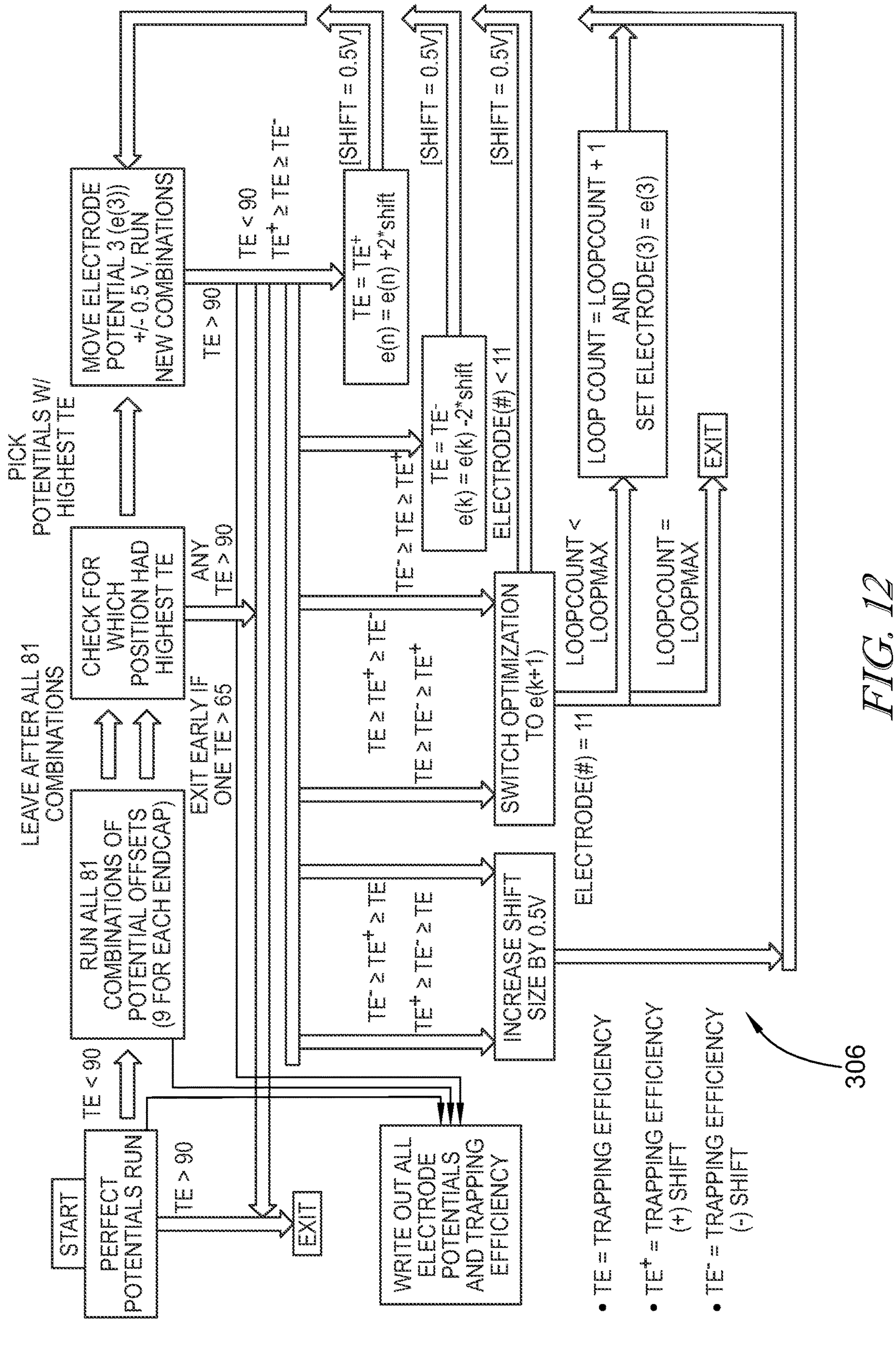
FIG. 12 is a logic flowchart illustrating an example embodiment of a process for determining voltages to apply to the mirror electrodes of the ion mirrors M1 and M2 of the ELIT of FIG. 5 with the mirror electrodes implemented as radially segmented electrodes each having eight equal-sized and radially spaced apart segments.

Referring to FIG. 11, for example, a plot 302 of trapping efficiency vs. potential shift is shown for the example of FIG. 9 in which the position of the ion mirror electrode $\mathbf{220}_3$, implemented as a radially segmented electrode ring with four radial segments, is shifted in the upwards direction by a half-thousandth of an inch, i.e., such that the central, longitudinal axis 218' defined through the radially segmented ion mirror is offset in the upwards direction from the central, longitudinal axis 218 of the ELIT 212 by a half-thousandth of an inch. Under such mechanically misaligned conditions, a potential shift of approximately 2.3 volts applied to the radial segments restores the trapping efficiency to near 100%. Since the physical offset of the radially segmented ion mirror electrode $\mathbf{220}_3$ is in the upwards direction, the potential shift of 2.3 volts is illustratively applied in the form of a negative ΔV to the bottom two radial segments (i.e., segments $\mathbf{28}_2$ and $\mathbf{28}_3$ in the example depicted in FIG. 2) and a positive ΔV to the top two radial segments (i.e., segments $\mathbf{28}_1$ and $\mathbf{28}_4$ in the example depicted in FIG. 2). The plot 304 of FIG. 11 similarly depicts a recovery of near 100% trapping efficiency for a four radial segment ion mirror electrode $\mathbf{220}_3$ shifted in the upwards direction by one thousandth of an inch by a potential shift of approximately 4.2 volts applied to the radial segments as just described.

In the ELIT 212 illustrated by example in FIGS. 5-6B, any single one, any combination, or all, of the ion mirror electrodes $\mathbf{220}_1$-$\mathbf{220}_4$ of either or both of the ion mirrors M1, M2 may be implemented in the form of radially segmented ion mirror electrodes, i.e., in the form of the radially segmented charged particle guide 20 illustrated by example in FIG. 2, each having any number of radial segments, and the voltage sources V1, V2 may be correspondingly configured to apply a separate DC voltage to each radial segment of each radially segmented ring electrode, all as described above with respect to FIGS. 1A-2. In one embodiment, each radially segmented ion mirror electrode includes eight radial segments each isolated from one another, e.g., by an air gap or dielectric as described above, although in alternate embodiments one or more radially segmented ion mirror electrodes may include more or fewer radial segments. In one example embodiment, which should not be considered limiting in any way, each of the inner ion mirror electrodes $\mathbf{220}_3$ are radially segmented, and in another example embodiment, each ion mirror electrode $\mathbf{220}_1$-$\mathbf{220}_3$ of each ion mirror M1 and M2 is radially segmented. In other embodiments, one or a combination of any of the ion mirror electrodes $\mathbf{220}_1$-$\mathbf{220}_3$ of the ion mirror M1 and/or of the ion mirror M2 may be radially segmented.

In this embodiment, the memory 216 illustratively has stored therein instructions executable by the processor(s) 214 to control the voltage sources V1, V2 to determine, in real time, magnitudes of the various voltages to apply to the respective radial segments, which maximize the trapping efficiency of the ELIT 212. Mechanical misalignments between two or more of the ion mirror electrodes of the ion mirror M1 and/or the ion mirror M2 will be compensated for by appropriate selection of the various voltages so as to result in focusing of charged particles to and along the central, longitudinal axis 218 of the ELIT 212. In this embodiment, one or more radially segmented charged particle guides of the type illustrated in FIG. 2 and described hereinabove are thus integrated directly into the ELIT 212. The charged particle position sensor, for providing an indicator of the desired position of the charged particle relative to the central, longitudinal axis of the one or more radially segmented charged particle guides, is a virtual sensor in the form of the trapping efficiency determination made by the processor(s) 214, and is therefore likewise integrated directly into the ELIT 212. In this embodiment, the exact position of a charged particle entering the radially segmented charged particle guide(s) (i.e., the radially segmented ion mirror electrode(s)) need not be known; rather, determining and applying the various voltages to the segments of the one or more radially segmented ion mirror electrodes in a manner which drives the trapping efficiency of the ELIT 212 to its maximum achievable value will automatically guide a charged particle entering the radially segmented charged particle guide(s) to and along the central, longitudinal axis 218 of the ELIT 212.

The instructions stored in the memory 216 and executable by the processor(s) 214 to control the voltage sources V1, V2 to determine the magnitudes of the various voltages to apply to the respective radial segments of the one or more radially segmented ion mirror electrodes of M1 and/or M2 so as to maximize the trapping efficiency of the ELIT 212 may incorporate any conventional optimization strategy. In one embodiment, which should be considered to be limiting in any way, the optimization strategy illustrated in the logic flow chart 306 of FIG. 12 may be used. The basic premise of the optimization strategy 306 starts with an evolution based approach, where several previously determined potential combinations for each ion mirror electrode are tested. These potentials correspond to average values between a half-thousandth and one-thousandth of an inch offset in each direction in 45-degree increments, with one combination being if the radially segmented ion mirror is perfectly aligned. In total, this corresponds to 9 total potential (voltage) combinations for each 8-segment ion mirror electrode. In embodiments in which all of the ion mirror electrodes of each of M1 and M2 are radially segmented, a total of 81 potential combinations exist for all of the ion mirror electrodes of each of M1 and M2 combined. Whenever the word "run" is used in the optimization process 306, the ion trapping efficiency and resolving power is determined for each combination of potentials.

Figure 13:
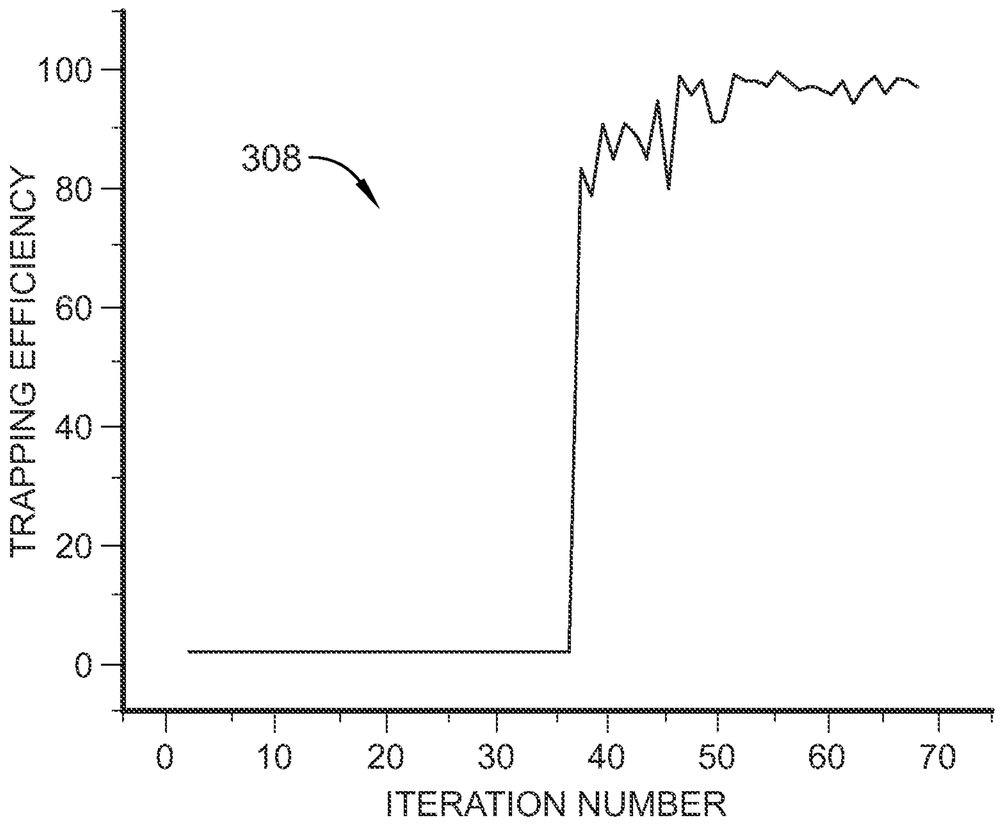
FIG. 13 is a plot of trapping efficiency vs iteration number illustrating convergence of the process illustrated in FIG. 12 with a trapping efficiency of greater than 95%.

Once each potential combination is run, the optimization strategy 306 will check for the combination of potentials with the highest trapping efficiency. If all trapping efficiencies are zero, the optimization strategy 306 illustratively starts performing a random walk (randomly adjusting potentials) with each radially segmented ion mirror electrode until it finds a non-zero trapping efficiency. Once a non-zero trapping efficiency value is found, the optimization strategy 306 will start shifting the ion mirror electrodes one at a time in a positive and negative direction by half-volt increments. From there, each new iteration is compared to the current best and the better of the two is kept. Depending upon their relation, the optimization strategy will choose what step to perform next as shown in the flowchart depicted in FIG. 12. A plot of example convergence 308 of the optimization process 306 is illustrated in FIG. 13 in which the trapping efficiency is plotted against the iteration number. As can be seen, the trapping efficiencies remained zero for a several iterations, then a combination with greater than zero efficiency is found as a starting point for further optimization, ultimately reaching a trapping potential above 95% at or after approximately 50 iterations. A large increase in trapping efficiency thus occurs once a close trapping potential combination is found, and the jagged upper portion of the plot 308 represents the logic brain slowly stepping one ion mirror electrode at a time toward the maximum achievable trapping efficiency.

Figure 14:
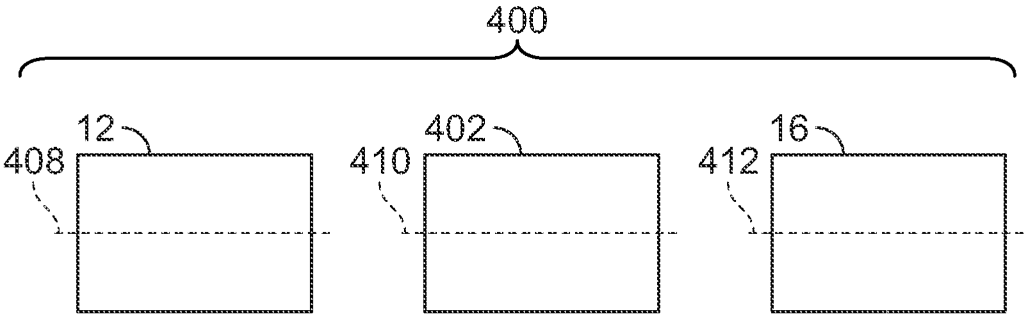
FIG. 14 is a simplified diagram of yet another embodiment of a charged particle analysis system having an ELIT, implemented with radially segmented ion mirrors, positioned between a charged particle source and a downstream charged particle analysis stage, wherein the ELIT is operated as described with respect to FIGS. 11-13 to act as a charged particle guide to focus charged particles exiting the upstream charged particle source to the inlet of the downstream charged particle analysis stage.

Referring now to FIG. 14, yet another embodiment is shown of a charged particle analysis system 400 which includes as a charged particle guide an ELIT 402 having one or more ion mirror electrodes implemented in the form of a radially segmented ion mirror electrode as described above with respect to the ELIT 212. In this embodiment, the ELIT 402 is positioned between the charged particle source 12 and the downstream charged particle analysis stage 16, wherein the charged particle source 12 and the charged particle analysis stage 16 may be as described hereinabove. As examples, which should not be considered to be limiting in any way, the charged particle analysis stage 16 may be or include another ELIT (with or without radially segmented ion mirror electrode(s)), an orbitrap, a target, or another charged particle analyzer. In the illustrated embodiment, the charged particle source 12 defines a longitudinal axis 408 centrally therethrough, the ELIT 402 defines a longitudinal axis 410 centrally therethrough, and the charged particle analysis stage 16 defines a longitudinal axis 412 centrally therethrough. Charged particles 26 may exit the charged particle source 12 along the axis 408, i.e., such that the charged particles move toward the charged particle inlet of the ELIT 402 along a path that is collinear with the central, longitudinal axis 408 of the charged particle source 12, or may alternatively exit the charged particle source 12 along any axial path. Illustratively, the axes 410 and 412 are aligned with one another, i.e., are collinear with one another, although in alternate embodiments the axes 410, 412 may not be aligned with one another. The axis 408 may or may not be aligned with the axis 410 and/or with the axis 412. Although not illustrated in FIG. 14, it will be understood that the system 400 includes at least the components electrically coupled to the ELIT 402 as illustrated by example in FIGS. 5-7 and described above.

The control circuit 214 is illustratively configured to control the voltage sources connected to the segments of the various radially segmented ion mirror electrodes as described above with respect to FIGS. 5-13. However, in the embodiment illustrated in FIG. 14, the ELIT 402 is not operated in this manner for the purpose of collecting charged particle mass or charge data as described above, but rather to cause the charged particles to move through the ELIT 402 along the axis 410. Once the ELIT 402 is set up to accomplish this, the control circuit 214 is thereafter operable to control the ELIT 402 to trap one or more charged particles exiting the charged particle source 12 and to cause the one or more trapped charged particles to oscillate back and forth between the ion mirrors M1, M2, as described above. After some time period or after some number of passes, the charged particle(s) should be traveling along, i.e., collinear with, the axis 410, and the control circuit 214 is then operable to control the ion mirror M2 to the transmission mode, as described above, such that the trapped charged particle(s) pass(es) out of the ELIT 402 and into the charged particle inlet of the downstream charged particle analysis stage 16. In the system 400, the ELIT thus acts as a charged particle guide to maximize entrance into the charged particle analysis stage 16 of charged particles exiting the charged particle source 12.

Figure 15A:
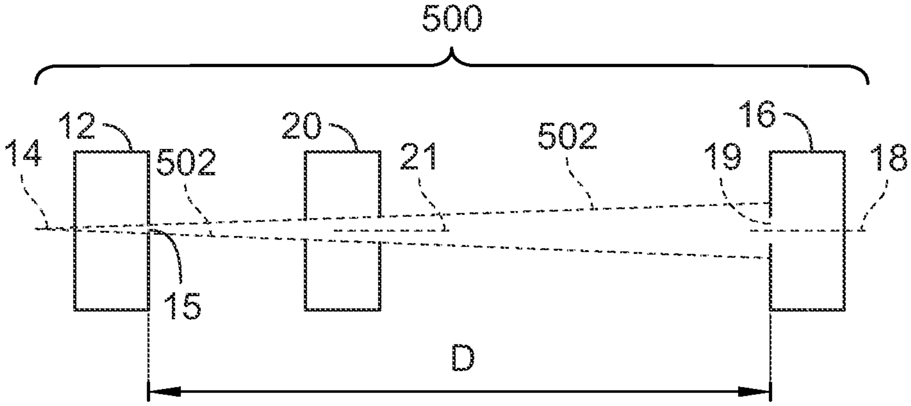
FIG. 15A is a simplified diagram of still another embodiment of a charged particle analysis system including a radially segmented charged particle guide for focusing charged particles exiting a charged particle source into a charged particle inlet of a charged particle analysis stage.
Figure 15B:
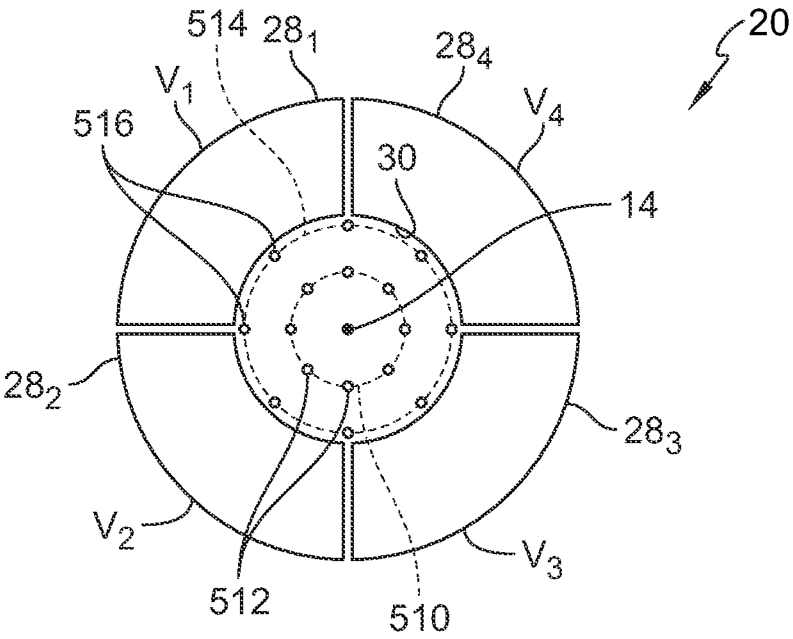
FIG. 15B is a simplified end view of an embodiment of the radially segmented charged particle guide of FIG. 15A in the form of a four-segment device with each segment operably coupled to a different amplitude-controllable voltage output of a DC voltage source, and illustrating focusing of charged particles passing therethrough according to operation of the system of FIG. 15A.

Referring now to FIGS. 15A and 15B, yet another embodiment is shown of a charged particle analysis system 500 which includes the radially segmented charged particle guide 20 positioned between the charged particle source 12 and the charged particle analysis stage 16, wherein the charged particle source 12 and the charged particle analysis stage 16 are generally as described above. In the illustrated embodiment, the charged particle source 12 defines a longitudinal axis 14 centrally therethrough, the radially segmented charged particle guide 20 defines a longitudinal axis 21 centrally therethrough, and the charged particle analysis stage 16 defines a longitudinal axis 18 centrally therethrough. As illustrated by example in FIG. 15A, the axes 14, 21, 18 are aligned with one another, i.e., the axes 14, 21, 18 are collinear with one another, although in alternate embodiments one or more of the axes 14, 21, 18 may be non-collinear with either or both of the other axes. In any case, the charged particle source 12 defines a charged particle outlet 15 through which charged particles exit the charged particle source 12, and the charged particle analysis stage 16 defines a charged particle inlet 19 through which charged particles enter the charged particle analysis stage 16. Although not illustrated in FIG. 15A, it will be understood that the system 500 includes at least the voltage source 22, electrically connected to the various segments of the radially segmented charged particle guide 20, and the control circuit 24, all as illustrated in FIGS. 1A-2 and described above.

In some embodiments of the charged particle source 12, charged particles may exit the charged particle outlet 15 with different trajectories and/or with different axial positions relative to the central, longitudinal axis 14 defined through the charged particle source 12. As one example, which should not be considered to be limiting in any way, the final stage of the charged particle source 12 may be or include a multi-pole device configured to operate as a charged particle guide or a mass-to-charge ratio filter. Such a multi-pole device may illustratively be implemented in the form of a conventional quadrupole device, but may alternatively be implemented in the form of a hexapole, octopole or other multi-pole configuration. When configured to operate as a charged particle guide or a mass-to-charge ratio filter, an AC voltage signal, e.g., RF sine wave, is applied between pairs of poles or electrodes of the multi-pole device, and such a device in quadrupole form with an RF voltage applied is typically referred to as an "RF only quadrupole" charged particle guide. When configured to operate as a charged particle mass-to-charge ratio filter, a DC voltage is additionally applied between pairs of the multi-pole device, and the magnitude of the DC voltage defines the mass-to-charge ratio range of charged particles that will exit the multi-pole device.

Charged particles axially traverse the multi-pole device while also oscillating in the radial direction about the central, longitudinal axis 14 as a result of the time-varying nature of the AC voltage applied to the electrode pairs of the multi-pole device. In embodiments, in which the applied AC voltage is, for example, a sinusoidal RF voltage, charged particles move in a sinusoidal pattern in the radial direction about the central, longitudinal axis 14 as the charged particles travel axially along the multi-pole device and through the charged particle outlet 15. As a result of such RF confinement, charged particles may exit the charged particle outlet 15 at a so-called "node," defined at and by the central, longitudinal axis 14, at a so-called "anti-node," defined as the furthest radial distance from the central, longitudinal axis 14, and at any point between the node and the anti-node. This phenomenon is referred to as "noding," and results in angular deviation from the central, longitudinal axis 14 of at least some of the charged particles exiting the charged particle source 12. Charged particles exiting the charged particle outlet 15 at an anti-node disperse angularly away from the central axis 14 as the charged particles travel toward the charged particle inlet 19 of the charged particle analysis stage 16. The angular deviance of the charged particles at the charged particle outlet 15 of the charged particle source 12, as illustrated by the dashed lines 502 in FIG. 15A, is exacerbated by the distance, D, between the charged particle outlet 15 of the charged particle source 12 and the charged particle inlet 19 of the charged particle analysis stage 16. As a result, some of the charged particles reaching the charged particle analysis stage 16 may be too widely dispersed to enter the charged particle inlet 19 of the charged particle analysis stage 16, as also depicted by example in FIG. 15A. Thus, whereas most or all of the charged particles focused about the central, longitudinal axis 14 will travel the distance D and enter the charged particle inlet 19 of the charged particle analysis stage 16, some of the charged particles exiting the charged particle outlet 15 of the charged particle source 12 at or near an anti-node, will not.

One novel technique for eliminating, or at least reducing, the effects of noding as described above, is to sweep the frequency of the RF voltage over a range of frequencies, and then average the charged particle measurement data obtained by the charged particle analysis stage 16 over the number of sweeps. Further details relating to this technique are disclosed in co-pending U.S. Patent Application Ser. No. 63/405,004, filed Sep. 9, 2022, and entitled METHOD OF CONTROLLING A MULTI-POLE DEVICE TO REDUCE OMISSION OF EXITING CHARGED PARTICLES FROM DOWNSTREAM ANALYSIS, the disclosure of which is incorporated herein by reference in its entirety.

Another approach to eliminating, or at least reducing, the effects of noding described above is also depicted by example in FIG. 15A in which the radially segmented charged particle guide 20 is positioned between the charged particle source 12 and the charged particle analysis system 16. Illustratively, the radially segmented charged particle guide 20 is positioned sufficiently close to the charged particle outlet 15 of the charged particle source 12 so that most or all of the charged particles exiting the charged particle outlet 15 of the charged particle source 12 will pass through the radially segmented charged particle guide 20.

Referring to FIG. 15B, the control circuit 24 is illustratively configured to eliminate, or at least reduce, the effects of noding described above by controlling the voltage source 22 in a manner which sequentially modifies the magnitudes of the voltages V1-V4 so as to force charged particles entering the radially segmented charged particle guide 20 about the periphery of the central, longitudinal axis 14 to axially exit the radially segmented charged particle guide 20 along a path that is at least closer to the central, longitudinal axis 14. This approach has the effect of radially focusing charged particles entering the radially segmented charged particle guide 20 in the radial space defined between the central, longitudinal axis 14 and the inner edges of the radial segments $28_1$-$28_4$ defining the opening 30 toward the central, longitudinal axis 14, thus ensuring that such charged particles exit the guide 20 along a path that is aligned with the charged particle inlet 19 of the charged particle analysis stage 16.

In the example illustrated in FIG. 15B, a periphery or radial path 510 is selected which is radially space apart from, and circumscribes, the central, longitudinal axis 14, and a number of discrete locations 512 about the radial path 510 are defined. In the illustrated example, eight such discrete locations 512 are defined equally spaced apart from one another about the radial path 510, although in alternate embodiments more or fewer such discrete locations may be defined about the radial path 510. For each discrete location 512, magnitudes of the voltages V1-V4 are then determined, e.g., via simulation or other conventional technique, which will force charged particles entering the radially segmented charged particle guide 20 at that location to exit the radially segmented charged particle guide 20 along the central, longitudinal axis 14, thereby resulting in eight different sets of modified voltages V1-V4. In operation, the control circuit 24 is configured to control V1-V4 with equal magnitudes for some time period so that charged particles focused about the axis 14 pass through the guide 20 and into the charged particle analysis stage 16, following by sequentially controlling V1-V4 to each of the eight different sets of modified voltages V1-V4 for the same time period so that charged particles entering the guide 20 in the area of each respective discrete location 512 are forced to exit the guide 20 closer to the central axis 14 so as to be captured by the charged particle analysis stage 16. Thereafter, the charged particle measurement data for each of the nine sets of voltages V1-V4 are averaged to provide a composite set of charged particle measurement data which, in many cases, will contain charge particle measurement data that would otherwise have been lost due to the effects of noding. In some severe cases of noding, another number of discrete locations 516 may be alternately or additionally defined about another radial path 514 spaced apart from the radial path 510 such that the radial path 514 is positioned between the radial path 510 and the inner peripheries of the radial segments $28_1$-$28_4$ which define the opening 30. In such cases, alternate or additional modified sets of voltage magnitudes V1-V4 may be determined, each of which will force charged particles entering the radially segmented charged particle guide 20 at a respective location 516 to exit the radially segmented charged particle guide 20 along the central, longitudinal axis 14, and the control circuit 24 may be operable as described above to collect and average the charged particle measurement data obtained for each set of voltages.

In the example system 500 illustrated in FIGS. 15A and 15B just described, the path(s) along which charged particles enter the radially segmented charged particle guide 20 need not be known or be repeatable. Moreover, the system 500 does not require a "sensor" to provide feedback as to the point or position of charged particles exiting the radially segmented charged particle guide 20, as the goal of control of the guide 20 is to force charged particles entering the guide 20 off-axis toward, but not necessarily precisely to, the axis 14. In any such implementation of the radially segmented charged particle guide 20, the control circuit(s) 24 will illustratively be configured, e.g., in the form of instructions stored in the memory 25 and executable by the control circuit(s) 24, to control the operation of the voltage source 22 to sequentially, and in some embodiments repeatedly, produce different sets of DC output voltages with magnitudes selected to guide charged particles entering the radially segmented charged particle guide 20 along various different paths to exit the radially segmented charged particle guide 20 in the axial direction along paths focused more toward the central, longitudinal axis 14 defined through the radially segmented charged particle guide 20.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, it will be understood that the ELIT 212 illustrated in the attached figures and described herein is provided only by way of example, and that the concepts, structures and techniques described above may be implemented directly in ELITs of various alternate designs. Any such alternate ELIT design may, for example, include any one or combination of two or more ELIT regions, more, fewer and/or differently-shaped ion mirror electrodes, more or fewer voltage sources, more or fewer voltage signals produced by one or more of the voltage sources, one or more ion mirrors defining additional electric field regions, or the like.

What is claimed is:

1. A charged particle analysis system, comprising:

a charged particle guide including a plurality of electrically conductive segments separate, and arranged radially spaced apart, from one another about an opening defined axially through the plurality of electrically conductive segments, the opening defining a central axis passing centrally and axially therethrough, the plurality of electrically conductive segments configured to receive charged particles at one end of the opening and to pass the received charged particles through an opposite end of the opening, at least one voltage source configured to produce and supply separately controllable voltages to each of the plurality of electrically conductive segments, and at least one control circuit configured to control the at least one voltage source to supply selected voltages to each of the plurality of electrically conductive segments to create an electric field within opening defined therethrough, the electric field configured to cause charged particles entering the one end of the opening along a first axial path relative to the central axis of the opening of the charged particle guide to exit the opposite end of the opening along a second axial path, different from the first axial path, relative to the central axis of the opening of the charged particle guide, wherein the first and second axial paths are not collinear, a charged particle analysis stage having a charged particle inlet spaced axially apart from the opposite end of the opening, the charged particle inlet defining a central axis passing centrally and axially therethrough, wherein the charged particle guide is configured to guide charged particles exiting the opening thereof into the charged particle inlet of the charged particle analysis stage, wherein the central axis of the charged particle inlet of the charged particle analysis stage is radially offset from the central axis of the opening of the charged particle guide, and wherein the second axial path is collinear with the central axis of the charged particle inlet of the charged particle analysis stage such that the electric field created within the opening by the at least one control circuit is configured to guide charged particles exiting the opening of the charged particle guide toward the central axis of the charged particle inlet of the charged particle analysis stage, and a charged particle position detector configured to produce at least one detection signal corresponding to a radial position, relative to the central axis of the charged particle inlet of the charged particle analysis stage or relative to the central axis of the opening of the charged particle guide, and wherein the at least one control circuit is configured to select the voltages to create the electric field within the opening of the charged particle guide based on the at least one detection signal.

2. The charged particle guide of claim 1, wherein the first axial path is collinear with the central axis of the opening of the charged particle guide, and wherein the second axial path is radially offset from the central axis of the opening of the charged particle guide.

3. The charged particle guide of claim 1, wherein the second axial path is collinear with the central axis of the opening of the charged particle guide, and wherein the first axial path is parallel radially offset from the central axis of the opening of the charged particle guide.

4. The charged particle guide of claim 1, wherein the first axial path is radially offset from the central axis of the opening of the charged particle guide, and wherein the second axial path is radially offset from the first axial path and radially offset from the central axis of the opening of the charged particle guide.

5. The charged particle guide of claim 1, wherein the opening is defined by and between inner surfaces of each of the plurality of electrically conductive segments.

6. The charged particle guide of claim 5, wherein the inner surface of at least one of the plurality of electrically conductive segments is arcuate in shape.

7. The charged particle guide of claim 6, wherein the inner surface of each of the plurality of electrically conductive segments is arcuate in shape such that the opening is circular in cross-section.

8. The charged particle guide of claim 5, wherein the inner surface of each of the plurality of electrically conductive segments is non-curvilinear.

9. A charged particle analysis system, comprising:

first and second spaced-apart ion mirrors, and a charge detection cylinder positioned between the first and second ion mirrors, the first and second ion mirrors and the charge detection cylinder together defining an electrostatic linear ion trap (ELIT) configured to trap therein charged particles supplied by a source of charged particles such that trapped charged particles oscillate back and forth between the first and second ion mirrors each time passing through the charge detection cylinder, the ELIT defining a central axis passing centrally and axially through each of the first and second ion mirrors and the charge detection cylinder, wherein each of the first and second ion mirrors includes a plurality of axially spaced apart ion mirror electrodes each defining an electrode opening through which the central axis of the ELIT passes, wherein at least one of the mirror electrodes comprises a charged particle guide including a plurality of electrically conductive segments separate, and arranged radially spaced apart, from one another about an opening defined axially through the plurality of electrically conductive segments, the opening defining a central axis passing centrally and axially therethrough, the plurality of electrically conductive segments configured to receive charged particles at one end of the opening and to pass the received charged particles through an opposite end of the opening, at least one voltage source configured to produce and supply separately controllable voltages to each of the plurality of electrically conductive segments, and at least one control circuit configured to control the at least one voltage source to supply selected voltages to each of the plurality of electrically conductive segments to create an electric field within opening defined therethrough, the electric field configured to cause charged particles entering the one end of the opening along a first axial path relative to the central axis of the charged particle guide to exit the opposite end of the opening along a second axial path, different from the first axial path, relative to the central axis of the charged particle guide, wherein the first and second axial paths are not collinear and wherein the central axis of the opening of the charged particle guide is radially offset from the central axis of the ELIT.

10. The charged particle analysis system of claim 9, wherein the electric field created within the opening by the at least one control circuit is configured to guide charged particles exiting the opening of the charged particle guide toward and along the central axis of the ELIT.

11. The charged particle analysis system of claim 9, wherein a charge is induced on the charge detection cylinder each time a charged particle passes therethrough, and wherein the charged particle analysis system further comprises a charge sensitive preamplifier having an input coupled to the charge detection cylinder and an output coupled to the at least one control circuit, the charge sensitive preamplifier responsive to each charged induced on the charge detection cylinder to produce a respective charge detection signal, and wherein the at least one control circuit is configured to be responsive to the charge detection signals to determine a trapping efficiency of the ELIT as a ratio of trapping events in which charged particles oscillate between the two ion mirrors for at least a predefined amount of a total trapping event time period and trapping events in which charged particles do not oscillate between the two ion mirrors for at least the predefined amount of the total trapping event time period, and wherein the at least one control circuit is configured to select the voltages to create the electric field configured to guide charged particles exiting the opening of the charged particle guide in a manner which maximizes the trapping efficiency.

12. A charged particle analysis system, comprising:

a charged particle source having a charged particle outlet via which charged particles exit the charged particle source, the charged particle outlet defining a central axis passing centrally and axially therethrough, a charged particle guide including a plurality of electrically conductive segments separate, and arranged radially spaced apart, from one another about an opening defined axially through the plurality of electrically conductive segments, the opening defining a central axis passing centrally and axially therethrough, the plurality of electrically conductive segments configured to receive charged particles at one end of the opening and to pass the received charged particles through an opposite end of the opening, at least one voltage source configured to produce and supply separately controllable voltages to each of the plurality of electrically conductive segments, and at least one control circuit configured to control the at least one voltage source to supply selected voltages to each of the plurality of electrically conductive segments to create an electric field within opening defined therethrough, the electric field configured to cause charged particles entering the one end of the opening along a first axial path relative to the central axis of the opening of the charged particle guide to exit the opposite end of the opening along a second axial path, different from the first axial path, relative to the central axis of the opening of the charged particle guide, wherein the first and second axial paths are not collinear, and wherein the one end of the opening of the charged particle guide is spaced axially apart from the charged particle outlet of the charged particle source, a charged particle analysis stage having a charged particle inlet spaced axially apart from the opposite end of the opening of the charged particle guide, the charged particle inlet defining a central axis passing centrally and axially therethrough, wherein the central axis of the opening of the charged particle guide is radially offset from at least one of the central axis of the charged particle outlet of the charged particle source and the central axis of the charged particle inlet of the charged particle analysis stage, and wherein the electric field created within the opening by the at least one control circuit is configured to guide charged particles exiting the charged particle outlet of the charged particle source into the charged particle inlet of the charged particle analysis stage, and a charged particle position detector configured to produce at least one detection signal corresponding to a radial position, relative to the central axis of the opening of the charged particle guide or relative to the central axis of the charged particle inlet of the charged particle analysis stage, wherein the at least one control circuit is configured to select the voltages to create the electric field configured to guide charged particles exiting the opening of the charged particle guide along a predetermined path, relative to the central axis of the opening of the charged particle guide or the central axis of the charged particle inlet of the charged particle analysis stage, based on the at least one detection signal.

13. The charged particle analysis system of claim 12, wherein the charged particle position detector is positioned between the charged particle guide and the charged particle analysis stage, and is mounted to one of the charged particle guide and the charged particle analysis stage.

14. A charged particle analysis system, comprising:

a charged particle source having a charged particle outlet via which charged particles exit the charged particle source, the charged particle outlet defining a central axis passing centrally and axially therethrough, a charged particle guide including a plurality of electrically conductive segments separate, and arranged radially spaced apart, from one another about an opening defined axially through the plurality of electrically conductive segments, the opening defining a central axis passing centrally and axially therethrough, the plurality of electrically conductive segments configured to receive charged particles at one end of the opening and to pass the received charged particles through an opposite end of the opening, at least one voltage source configured to produce and supply separately controllable voltages to each of the plurality of electrically conductive segments, and at least one control circuit configured to control the at least one voltage source to supply selected voltages to each of the plurality of electrically conductive segments to create an electric field within opening defined therethrough, the electric field configured to cause charged particles entering the one end of the opening along a first axial path relative to the central axis of the opening of the charged particle guide to exit the opposite end of the opening along a second axial path, different from the first axial path, relative to the central axis of the opening of the charged particle guide, wherein the first and second axial paths are not collinear, and wherein the one end of the opening of the charged particle guide is spaced axially apart from the charged particle outlet of the charged particle source, a charged particle analysis stage having a charged particle inlet spaced axially apart from the opposite end of the opening of the charged particle guide, the charged particle inlet defining a central axis passing centrally and axially therethrough, wherein the central axis of the opening of the charged particle guide is radially offset from at least one of the central axis of the charged particle outlet of the charged particle source and the central axis of the charged particle inlet of the charged particle analysis stage, and wherein the electric field created within the opening by the at least one control circuit is configured to guide charged particles exiting the charged particle outlet of the charged particle source into the charged particle inlet of the charged particle analysis stage, and means for determining a percentage of charged particles exiting the charged particle outlet of the charged particle source that enter the charged particle inlet of the charged particle analysis stage, and wherein the at least one control circuit is configured to select the voltages to create the electric field configured to guide charged particles exiting the charged particle guide in a manner which maximizes the percentage of charged particles exiting the charged particle outlet of the charged particle source that enter the charged particle inlet of the charged particle analysis stage.

15. A charged particle analysis system, comprising:

a charged particle source having a charged particle outlet via which charged particles exit the charged particle source, the charged particle outlet defining a central axis passing centrally and axially therethrough, a charged particle guide including a plurality of electrically conductive segments separate, and arranged radially spaced apart, from one another about an opening defined axially through the plurality of electrically conductive segments, the opening defining a central axis passing centrally and axially therethrough, the plurality of electrically conductive segments configured to receive charged particles at one end of the opening and to pass the received charged particles through an opposite end of the opening, at least one voltage source configured to produce and supply separately controllable voltages to each of the plurality of electrically conductive segments, and at least one control circuit configured to control the at least one voltage source to supply selected voltages to each of the plurality of electrically conductive segments to create an electric field within opening defined therethrough, the electric field configured to cause charged particles entering the one end of the opening along a first axial path relative to the central axis of the opening of the charged particle guide to exit the opposite end of the opening along a second axial path, different from the first axial path, relative to the central axis of the opening of the charged particle guide, wherein the first and second axial paths are not collinear, and wherein the one end of the opening of the charged particle guide is spaced axially apart from the charged particle outlet of the charged particle source, and a charged particle analysis stage having a charged particle inlet spaced axially apart from the opposite end of the opening of the charged particle guide, the charged particle inlet defining a central axis passing centrally and axially therethrough, wherein the central axis of the opening of the charged particle guide is radially offset from at least one of the central axis of the charged particle outlet of the charged particle source and the central axis of the charged particle inlet of the charged particle analysis stage, and wherein the electric field created within the opening by the at least one control circuit is configured to guide charged particles exiting the charged particle outlet of the charged particle source into the charged particle inlet of the charged particle analysis stage, wherein the charged particle source includes a multi-pole transmission device configured to receive charged particles at a charged particle inlet thereof and to transmit the received charged particles through a charged particle outlet thereof, and an AC voltage source operatively coupled to the multi-pole transmission device and configured to apply an AC voltage to the multi-pole transmission device to guide the received charged particles through the charged particle outlet thereof, and wherein the at least one control circuit is configured to (i) control the at least one voltage source to sequentially supply each of a number of different sets of voltages to each of the plurality of electrically conductive segments, the number of different sets of voltages selected to create corresponding electric fields within the opening of the charged particle guide configured to guide charged particles entering the opening from the charged particle outlet of the multi-pole transmission device about a periphery of the central axis of the opening of the charged particle guide toward the central axis of the opening so as to focus charged particles exiting the opening of the charged particle guide about the central axis thereof, (ii) control the at least one charged particle analysis stage to measure mass-to-charge ratios of the charged particles exiting the charged particle guide for each of the number of different sets of voltages supplied by the at least one voltage source to produce a corresponding number of different sets of charged particle measurements, and (iii), average the measured mass-to-charge ratios of the charged particles in the number of different sets of charged particle measurements to produce a resulting set of mass-to-charge ratios of the received charged particles.

* * * * *